(12) United States Patent
Srinivasan et al.

(10) Patent No.: US 11,221,540 B2
(45) Date of Patent: Jan. 11, 2022

(54) OPTICAL PARAMETRIC OSCILLATOR AND PRODUCING IDLER COHERENT LIGHT AND SIGNAL COHERENT LIGHT FROM PUMP COHERENT LIGHT

(71) Applicant: Government of the United States of America, as represented by the Secretary of Commerce, Gaithersburg, MD (US)

(72) Inventors: Kartik Arvind Srinivasan, Rockville, MD (US); Xiyuan Lu, Montgomery Village, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 17/023,732

(22) Filed: Sep. 17, 2020

(65) Prior Publication Data
US 2021/0080805 A1    Mar. 18, 2021

Related U.S. Application Data

(60) Provisional application No. 62/901,456, filed on Sep. 17, 2019.

(51) Int. Cl.
*G02F 1/39*    (2006.01)
*G02F 1/35*    (2006.01)

(52) U.S. Cl.
CPC ............ *G02F 1/395* (2013.01); *G02F 1/3501* (2013.01); *G02F 1/3509* (2021.01)

(58) Field of Classification Search
CPC ...................................................... G02F 1/395
See application file for complete search history.

(56) References Cited

U.S. PATENT DOCUMENTS 9,490,605 B2 * 11/2016 Gaeta .................... H01S 5/5054
10,261,391 B2 * 4/2019 Casale ............... G02B 6/29338
(Continued)

OTHER PUBLICATIONS

J. A. Black, S. Yu, R. Streater, J. R. Stone, X. Lu, G. Moille, K. Srinivasan, and S. B. Papp, "Optical synthesis by spectral translation ,"in Conference on Lasersand Electro-Optics, OSA Technical Digest (Optical Society of America, 2020), paper STu3H.1. (Year: 2020).*

(Continued)

*Primary Examiner* — Rhonda S Peace
(74) *Attorney, Agent, or Firm* — Office of Chief Counsel for National Institute of Standards and Technology

(57) ABSTRACT

An optical parametric oscillator for producing idler coherent light and signal coherent light from pump coherent light by balanced parametric dispersion includes: substrate cladding; a microring resonator disposed on the substrate cladding and including: a broadly transparent Kerr nonlinear medium including a annulus with a radius R, a height H, and a width W that provides a balanced parametric dispersion; and that: receives pump coherent light from a waveguide; and produces idler coherent light and signal coherent light from the pump coherent light, the idler coherent light and signal coherent light produced according to the balanced parametric dispersion of the microring resonator; and the waveguide disposed on the substrate cladding in optical communication with the microring resonator and comprising a broadly transparent medium such as silicon nitride and that: receives pump coherent light; and communicates the pump coherent light to the microring resonator for production of the idler coherent light and the signal coherent light from the pump coherent light.

20 Claims, 22 Drawing Sheets

(56) References Cited

U.S. PATENT DOCUMENTS

| | | | |
|---|---|---|---|
| 10,268,100 B2* | 4/2019 | Sciancalepore | G02F 1/365 |
| 11,016,363 B2* | 5/2021 | Lin | G02F 1/3551 |
| 11,063,402 B2* | 7/2021 | Wong | H01S 3/1608 |
| 2014/0193155 A1* | 7/2014 | Popovic | G02F 1/395 |
| | | | 398/82 |
| 2021/0080805 A1* | 3/2021 | Srinivasan | G02F 1/3501 |

OTHER PUBLICATIONS

X. Lu, G. Moille, A. Singh, Q. Li, D. Westly, A. Rao, S. Yu, T. C. Briles, T. Drake, S. B. Papp, and K. Srinivasan, "Efficient widely-separated optical parametric oscillation," in Conference on Lasers and Electro-Optics, OSA Technical Digest (Optical Society of America, 2020), paper SF2B.7. (Year: 2020).*

Lu, X., et al., "Milliwatt-threshold visible-telecom optical parametric oscillation using silicon nanophotonics", Optica, 2019, p. 1535-1541, vol. 6 No. 12.

Lu, X., et al., "On-chip optical parametric oscillation into the visible: generating red, orange, yellow, and green from a near-infrared pump", Physics Optics, 2020, doi: https://arxiv.org/pdf/2003.12177.pdf.

* cited by examiner

| $P_{th}$ | $\omega_p/(2\pi)$ | $Q_{cp}$ | $Q_{tp}$ | $Q_{ts}$ | $Q_{ti}$ | $\bar{n}_{ipsp}$ | $\bar{V}_{ipsp}$ | $\eta_{ipsp}$ | $\chi^{(3)}_{ipsp}$ |
|---|---|---|---|---|---|---|---|---|---|
| 28 mW | 390 THz | $3.0 \times 10^6$ | $1.0 \times 10^6$ | $0.1 \times 10^6$ | $0.1 \times 10^6$ | 2.0 | 26.6 μm$^3$ | 0.94 | $3.39 \times 10^{-21}$ m2/V2 |
| 2.8 mW | 390 THz | $3.0 \times 10^6$ | $1.0 \times 10^6$ | $1.0 \times 10^6$ | $1.0 \times 10^6$ | 2.0 | 26.6 μm$^3$ | 0.94 | $3.39 \times 10^{-21}$ m2/V2 |

OPTICAL PARAMETRIC OSCILLATOR AND PRODUCING IDLER COHERENT LIGHT AND SIGNAL COHERENT LIGHT FROM PUMP COHERENT LIGHT

CROSS REFERENCE TO RELATED APPLICATIONS

The application claims priority to U.S. Provisional Patent Application Ser. No. 62/901,456, filed Sep. 17, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce, under Agreement No. 70NANB10H193 and the Defense Advanced Research Projects Agency (DARPA), an agency of the United States Department of Defense. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 19-052US1.

BRIEF DESCRIPTION

Disclosed is an optical parametric oscillator for producing idler coherent light and signal coherent light from pump coherent light by balanced parametric dispersion, the optical parametric oscillator comprising: substrate cladding; a microring resonator disposed on the substrate cladding and comprising: a Kerr nonlinear medium shaped into a microring with a radius R, a height H, and a width W that provides a balanced parametric dispersion; and that: receives pump coherent light from a waveguide; and produces idler coherent light and signal coherent light from the pump coherent light, the idler coherent light and signal coherent light produced according to the balanced parametric dispersion of the microring resonator; and the waveguide disposed on the substrate cladding in optical communication with the microring resonator and comprising a Kerr nonlinear medium and that: receives pump coherent light; and communicates the pump coherent light to the microring resonator for production of the idler coherent light and the signal coherent light from the pump coherent light.

Disclosed is a process for producing idler coherent light and signal coherent light from pump coherent light with the optical parametric oscillator of claim 1, the process comprising: receiving the pump coherent light by the waveguide; communicating the pump coherent light from the waveguide to the microring resonator; and producing the idler coherent light and the signal coherent light from the pump coherent light according to the balanced parametric dispersion of the microring resonator.

BRIEF DESCRIPTION OF THE DRAWINGS

The following description should not be considered limiting in any way. With reference to the accompanying drawings, like elements are numbered alike.

FIG. 22 shows parameters to estimate threshold power of widely-separated OPO. $Q_{cp}$ and $Q_{tp}$ are estimated values from experiments, where $Q_{0p} \approx 1.5\times10^6$ and the cavity mode is undercoupled ($Q_{cp}>Q_{0p}$). Threshold power depends on $Q_{ts}$ and $Q_{ti}$ values and is ≈2.8 mW for signal and idler modes with similar Q ($10^6$) to the pump. Mode volume and mode overlap are from finite-element-method simulation.

DETAILED DESCRIPTION

A detailed description of one or more embodiments is presented herein by way of exemplification and not limitation.

It has been discovered that an optical parametric oscillator (OPO) and processes described herein produce coherent light on-chip that fulfills a long-felt need that was recognized, persistent, and not solved by others in frequency ranges for which conventional laser gain media do not exist or do not perform well. The OPO and processes described herein provide a nanophotonic article with output coherent light that are widely spectrally separated and that operate with ultra-low pump power using silicon nanophotonics. The OPO and processes described herein provide advantages in power efficiency with low sub-mW threshold power, device scalability, and access to a broad range of output wavelengths. Furthermore, OPO and processes described herein can directly integrate compact chip-based lasers without an intermediate amplifier.

Figure 1:
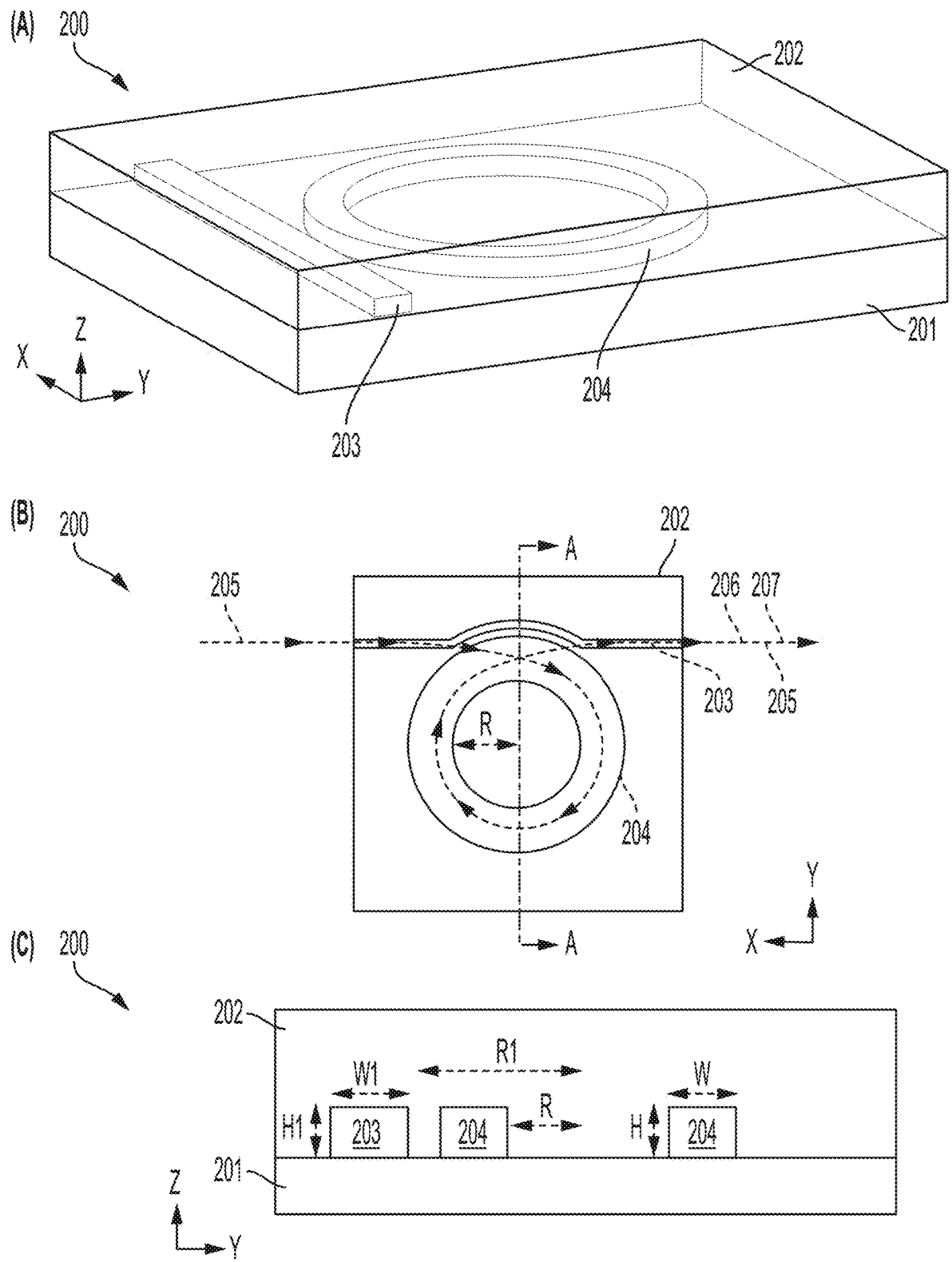
FIG. 1 shows an optical parametric oscillator in perspective view (panel A), top view (panel B), and cross-section (panel C) along line A-A shown in panel B.

Optical parametric oscillator 200 produces idler coherent light 206 and signal coherent light 207 from pump coherent light 205 by balanced parametric dispersion 210 of microring resonator 204. In an embodiment, with reference to FIG. 1 and FIG. 2, optical parametric oscillator 200 includes: substrate cladding 201; microring resonator 204 disposed on substrate cladding 201 and including: Kerr nonlinear medium fashioned into a ring geometry with radius R, height H, and width W that provides balanced parametric dispersion 210; and that: receives pump coherent light 205 from waveguide 203; and produces idler coherent light 206 and signal coherent light 207 from pump coherent light 205, idler coherent light 206 and signal coherent light 207 produced according to balanced parametric dispersion 210 of microring resonator 204; and waveguide 203 disposed on substrate cladding 201 in optical communication with microring resonator 204 and including the Kerr nonlinear medium and that: receives pump coherent light 205; and communicates pump coherent light 205 to microring resonator 204 for production of idler coherent light 206 and signal coherent light 207 from pump coherent light 205.

In an embodiment, optical parametric oscillator 200 further includes: cover cladding 202 disposed on waveguide 203, microring resonator 204, and substrate cladding 201 such that microring resonator 204 and waveguide 203 are interposed between substrate cladding 201 and cover cladding 202 to encapsulate microring resonator 204 and waveguide 203.

In an embodiment, optical parametric oscillator 200 further includes: second waveguide 203 in optical communication with microring resonator 204 and including a Kerr nonlinear medium and that receives idler coherent light 206 and signal coherent light 207 from microring resonator 204.

Components of optical parametric oscillator 200 can be made from and include various materials. Substrate cladding 201 has a lower refractive index than microring resonator 204 and waveguide 203 and supports broadband optical transparency that spans a wavelength range inclusive pump coherent light 205, idler coherent light 206, and signal coherent light 207. The substrate cladding can include a plurality of layers that can be disposed, e.g., immediately under microring resonator 204 and that can be a lower refractive index than microring resonator 204. Substrate cladding 201 provides a lower refractive index medium to support guided optical modes of waveguide 203 and microring resonator 204 as well as a mechanical structure for disposition of other elements of optical parametric oscillator 200 thereon. Substrate cladding 201 can include silicon dioxide in proximity to microring resonator 204 and silicon underneath the silicon dioxide, but the silicon dioxide can also be substituted by other materials with similar refractive indices such as sapphire, quartz, or MgF2. A thickness of substrate cladding 201 can be from 500 nm to 5 mm, specifically from 1 µm to 1 mm, and more specifically from 1 µm to 10 µm. It is contemplated that the thickness of the low refractive index layer (e.g., silicon dioxide) within substrate cladding 201 can be from 500 nm to 5 mm, specifically from 1 µm to 10 µm, and more specifically from 1 µm to 1 mm. In an embodiment, substrate cladding 201 is silicon dioxide.

Cover cladding 202 can, in combination with substrate cladding 201, cover and encapsulate waveguide 203 and microring resonator 204 between cover cladding 202 and substrate cladding 201. Cover cladding 202 has a lower refractive index than microring resonator 204 and waveguide 203 and supports broadband optical transparency that spans a wavelength range inclusive of pump coherent light 205, idler coherent light 206, and signal coherent light 207. The cover cladding can include a plurality of layers that can be disposed, e.g., immediately above microring resonator 204 and can have a lower refractive index than microring resonator 204. Cover cladding 202 can include silicon dioxide or also can be substituted by other materials with similar refractive indices such as photoresist or electron beam resist, doped glasses, or intermediate refractive index materials (i.e., materials with a refractive index higher than silicon dioxide but lower than that of microring resonator 204) such as silicon oxynitride. A thickness of cover cladding 202 can be from 1 nm to 1 cm, specifically from 1 µm to 1 mm, and more specifically from 1 µm to 3 µm. In an embodiment, cover cladding 202 is silicon dioxide.

Waveguide 203 receives pump coherent light 205 and communicates pump coherent light 205 to pump coherent light 204 via evanescent coupling. Waveguide 203 can include a core material that has a refractive index greater than that of substrate cladding layer 201 and that supports broadband optical transparency that spans the wavelength range of pump coherent light 205, idler coherent light 206, and signal coherent light 207. Waveguide 203 can include a material such as silicon nitride, silicon oxynitride, or a combination including at least one of the materials. Optical parametric oscillator 200 can include a plurality of waveguides 203 (e.g., 203.1, 203.2 shown in FIG. 2), wherein a number of waveguides 203 can be selected to communicate independently or in combination pump coherent light 205, idler coherent light 206, or signal coherent light 207. In an embodiment, waveguide 203 communicates pump coherent light 205, idler coherent light 206, and signal coherent light 207. In an embodiment, first waveguide 203.1 communicates pump coherent light 205 and idler coherent light 206, and second waveguide 203.2 communicates signal coherent light 207. In an embodiment, first waveguide 203.1 communicates pump coherent light 205 and signal coherent light 207, and second waveguide 203.2 communicates idler coherent light 206. In an embodiment, first waveguide 203.1 communicates pump coherent light 205; second waveguide 203.2 communicates idler coherent light 206, and third waveguide 203.3 communicates signal coherent light 207. Distance R1 from a center of microring resonator 204 to a closest portion of waveguide 203 can be from 100 nm to 1 cm, specifically from 1 µm to 1 mm, and more specifically from 10 µm to 100 µm. A separation distance between microring resonator 204 to a closest portion of waveguide 203 can be from 100 nm to 1 cm, specifically from 1 µm to 1 mm, and more specifically from 10 µm to 100 µm. A width W and height H of waveguide 203 can be from 100 nm to 10 µm, specifically from 100 nm to 5 µm, and more specifically from 100 nm to 2 µm. In an embodiment, waveguide 203 is silicon nitride.

Microring resonator 204 receives pump coherent light 205 from waveguide 203 and produces pump coherent light 205 to pump coherent light 205 from pump coherent light 205. Microring resonator 204 can include a core material that has a refractive index that is greater than that of substrate cladding 201 and that supports broadband optical transparency that spans the wavelength range of pump coherent light 205, idler coherent light 206, and signal coherent light 207. The materials also support a Kerr nonlinearity (also known as a third-order optical nonlinearity). Microring resonator 204 can include a material that satisfies the above criteria, such as silicon nitride, silicon oxynitride, tantalum pentoxide, aluminum nitride, lithium niobate, gallium phosphide, gallium nitride, aluminum gallium arsenide, or a combination including at least one of the foregoing materials. A radius R of microring resonator 204 can be from 100 nm to 1 cm, specifically from 1 μm to 5 mm, and more specifically from 10 μm to 500 μm. A width W and height H of microring resonator 204 can be from 100 nm to 10 μm, specifically from 100 nm to 5 μm, and more specifically from 100 nm to 2 μm. In an embodiment, microring resonator 204 is silicon nitride.

Figure 3:
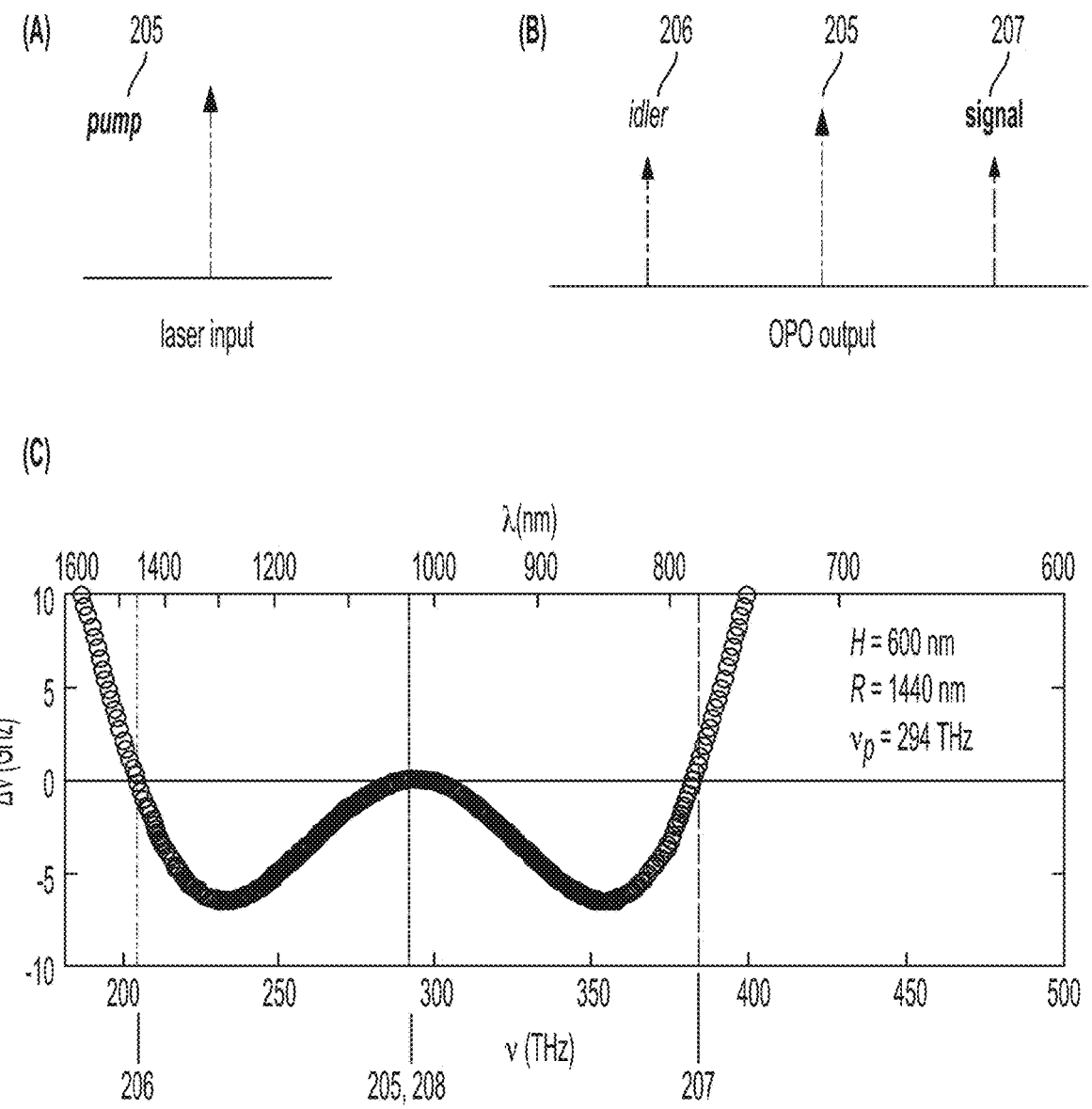
FIG. 3 shows laser input for optical parametric oscillator in panel A, output from the optical parametric oscillator in panel B, and a parametric dispersion curve of the optical parametric oscillator that has balanced parametric dispersion in panel C.
Figure 4:
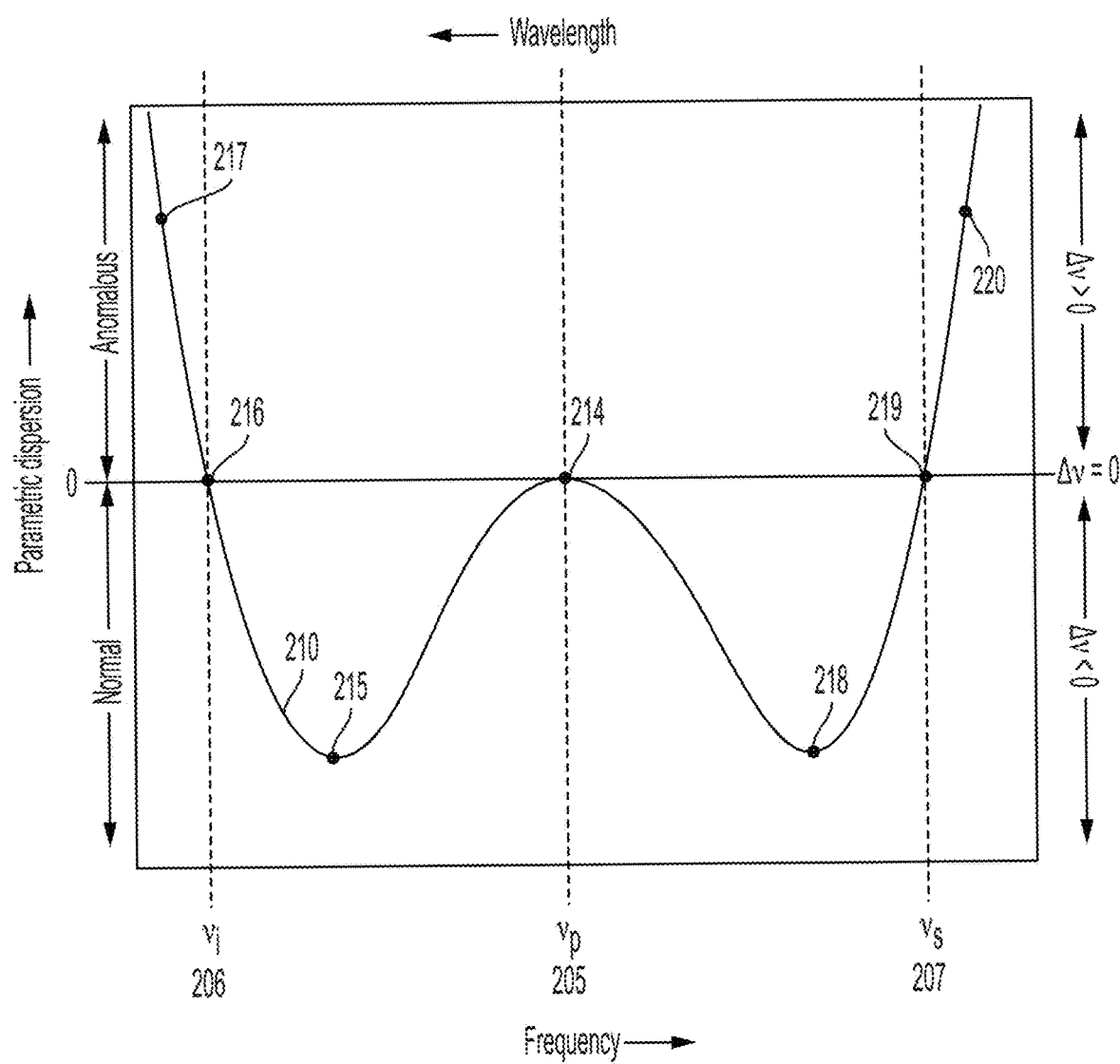
FIG. 4 shows a parametric dispersion curve for an optical parametric oscillator that has balanced parametric dispersion.

For production of idler coherent light 206 and signal coherent light 207 from pump coherent light 205, pump coherent light 205 has balanced parametric dispersion 210 as shown in FIG. 3 and FIG. 4 for the parametric dispersion of pump coherent light 205 as a function of frequency, referred to as a parametric dispersion curve. Balanced parametric dispersion 210 includes pump frequency node 214 at pump frequency $v_p$ and including a parametric dispersion that is zero; idler frequency node 216 at idler frequency $v_i$ and including a parametric dispersion that is zero; idler normal dispersion minimum 215 interposed at a frequency between pump frequency $v_p$ and idler frequency $v_i$ and including a normal parametric dispersion; idler anomalous dispersion frequency 217 at a frequency that is less than idler frequency $v_i$ and including an anomalous parametric dispersion; signal frequency node 219 at signal frequency $v_s$ and including a parametric dispersion that is zero; signal normal dispersion minimum 218 interposed at a frequency between pump frequency $v_p$ and signal frequency $v_s$ and including a normal parametric dispersion; and signal anomalous dispersion frequency 220 at a frequency that is greater than signal frequency $v_s$ and including an anomalous parametric dispersion; wherein: balanced parametric dispersion 210 consists essentially of normal parametric dispersion between idler frequency node 216 and pump frequency node 214; and balanced parametric dispersion 210 consists essentially of normal parametric dispersion between pump frequency node 214 and signal frequency node 219. Without wishing to be bound by theory, it is believed that balanced parametric dispersion 210 is a consequence of the material composition of microring resonator 204, substrate cladding 201, and cover cladding 202 (if present), and in particular, the wavelength-dependence of the refractive index or indices of their constituent materials, in combination with the physical dimension (radius R, height H, width W) of microring resonator 204. In this regard, balanced parametric dispersion results from the combined effect of the dispersion of the constituent materials (i.e., the variation in their refractive indices as a function of wavelength/frequency) and the geometric dispersion associated with the optical confinement provided by the microring resonator.

As used herein, parametric dispersion Δv refers to $\Delta v = v_s + v_i - 2v_p$, wherein $v_s$ is the frequency of signal coherent light 207; $v_i$ is the frequency of idler coherent light 206, and $v_p$ is the frequency of pump coherent light 205. Further, a node in a parametric dispersion curve has parametric dispersion that is zero, i.e., Δv=0. Normal parametric dispersion has a negative parametric dispersion, i.e., Δv<0. Anomalous parametric dispersion has a positive parametric dispersion, i.e., Δv>0.

Figure 5:
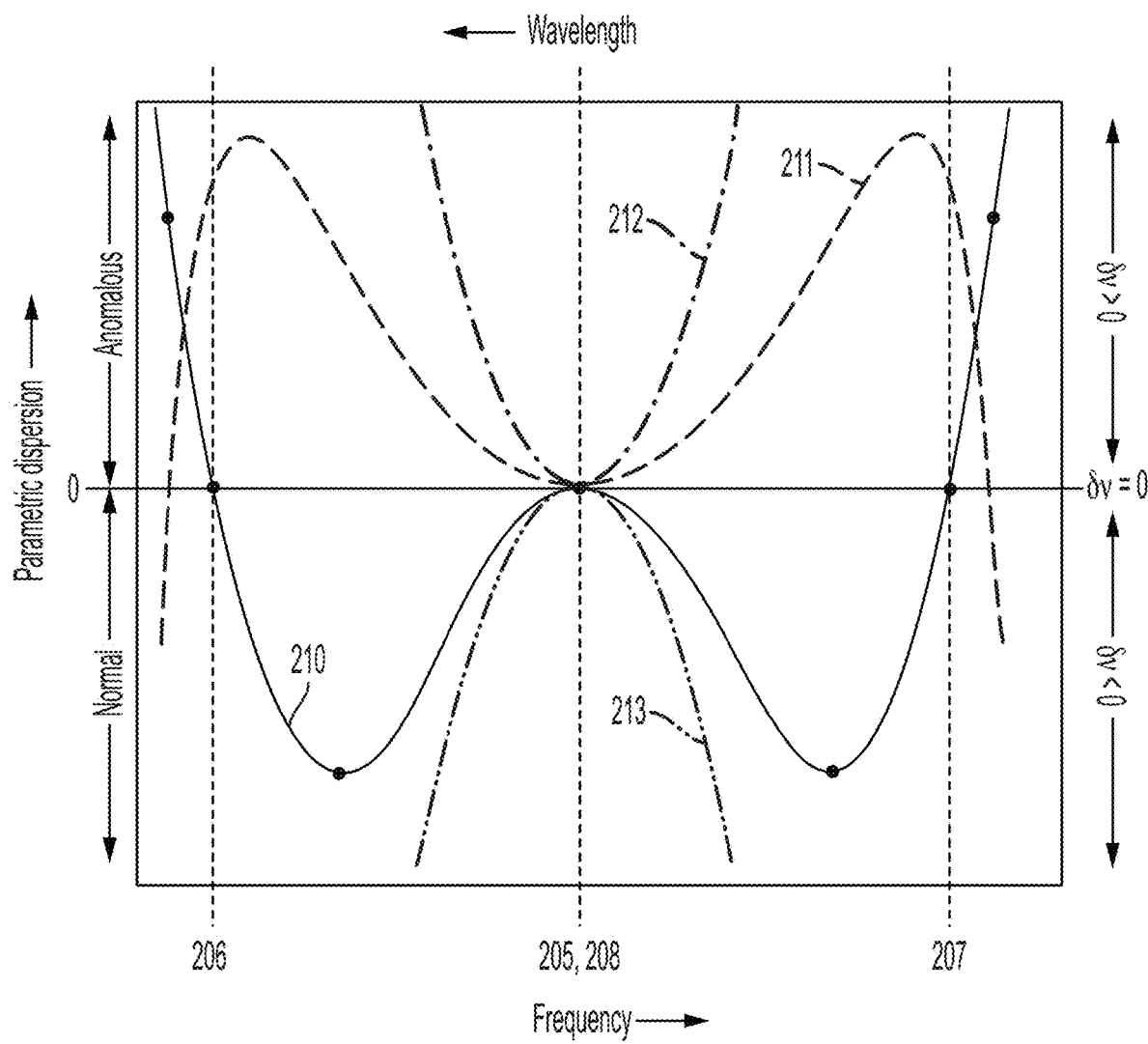
FIG. 5 shows a plurality of parametric dispersion curves compared with balanced parametric dispersion.
Figure 6:
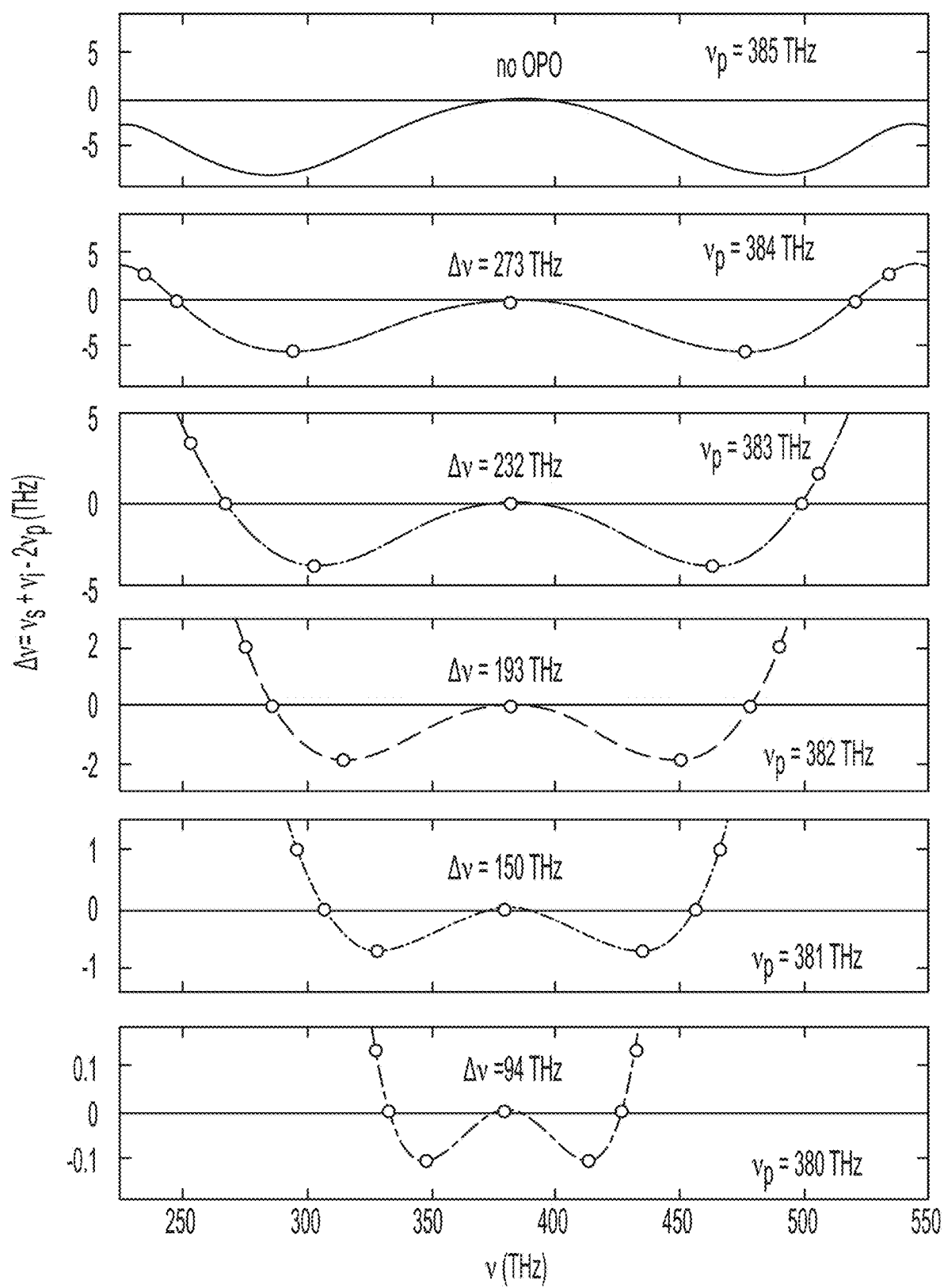
FIG. 6 shows a plurality of parametric dispersion curves that have balanced parametric dispersion.

In contrast to balanced parametric dispersion 210 shown in FIG. 4 that characterizes microring resonator 204, conventional resonators can have a parametric dispersion curve shown in FIG. 5 (except for balanced parametric dispersion 210 that is shown for comparison) that include negative parametric dispersion 211, concave parametric dispersion 212, and convex parametric dispersion 213 that lack nodes, normal parametric dispersion, and anomalous parametric dispersion of balanced parametric dispersion 210. Again, it is noted that balanced parametric dispersion 210 is included in FIG. 5 for comparison of negative parametric dispersion 211, concave parametric dispersion 212, and convex parametric dispersion 213.

Pump coherent light 205 can have a frequency selected so that microring resonator 204 produces desired frequencies of idler coherent light 206 and signal coherent light 207. It is contemplated that the frequency of pump coherent light 205 is from 100 THz to 800 THz, specifically 150 THz to 600 THz, and more specifically from 200 THz to 400 THz. A frequency of idler coherent light 206 can be from 50 THz to 800 THz, specifically 50 THz to 400 THz, and more specifically from 50 THz to 300 THz. A frequency of signal coherent light 207 can be from 100 THz to 1000 THz, specifically 200 THz to 800 THz, and more specifically from 400 THz to 750 THz. In an embodiment, a central wavelength of idler coherent light 206 and a central wavelength of pump coherent light 205 can be separated by a frequency difference from 50 THz to 750 THz, specifically 100 THz to 600 THz, and more specifically from 150 THz to 300 THz. According to an embodiment, a central wavelength of signal coherent light 207 and a central wavelength of pump coherent light 205 can be separated by a frequency difference from 50 THz to 750 THz, specifically 100 THz to 600 THz, and more specifically from 150 THz to 300 THz.

A power of pump coherent light 205 injected into waveguide 203 and received by microring resonator 204 that satisfies balanced parametric dispersion 210 so that microring resonator 204 can produce idler coherent light 206 and signal coherent light 207 through nonlinear processes is in accord with the threshold power relationship:

$$P_{in} = \frac{1}{\Gamma_p} \frac{\Gamma_t}{2} \frac{1}{\gamma_{FWM}} \left[ \left( \frac{\Delta \omega_0}{2} - \frac{\Gamma_t}{2} \frac{\gamma_{PM}}{\gamma_{FWM}} \right)^2 + \left( \frac{\Gamma_{tp}}{2} \right)^2 \right],$$

wherein $P_{in}$ is a power of pump coherent light 205 injected into waveguide 203; $\Gamma_t$ is the geometric mean of the microring resonator total energy loss rate at the signal and idler frequencies; $\Gamma_{tp}$ is the microring resonator total energy loss rate at the pump frequency; $\Gamma_{cp}$ is the coupling rate between microring resonator 204 and waveguide 203; $\gamma_{FWM}$ is the effective four-wave mixing nonlinear parameter and $\gamma_{PM}$ is the effective nonlinear parameter associated with the difference between cross-phase modulation and self-phase modulation. $\Delta \omega_0$ is the natural cavity mismatch and is $2\pi$ times the parametric dispersion $\Delta v = v_s + v_i - 2v_p$. It should be appreciated that the threshold power is minimized when the natural cavity mismatch $\Delta \omega_0$ is a positive value that matches difference between the effects of self-phase and cross-phase modulation, i.e., $\Delta \omega_0 = \Gamma_t \gamma_{PM}/\gamma_{FWM}$. However, when nonlinear phase shifts are small then OPO at low power can be achieved with a natural cavity mismatch $\Delta\omega_0=0$.

It should be appreciated that optical parametric oscillator 200 is a chip-integrated optical parametric oscillator with signal and idler output fields as idler coherent light 206 and signal coherent light 207 that are widely separated in frequency and that are produced from silicon nanophotonics. In an embodiment, optical parametric oscillator 200 includes microring resonator 204 with integrated waveguide 203 on-chip for coupling pump coherent light 205 into microring resonator 204 and extracting generated light (206, 207) out of microring resonator 204. Microring resonator 204 and waveguide 203 are defined in a thin film (sub-micrometer) of a Kerr nonlinear medium such as silicon nitride ($Si_3N_4$) that is disposed on a lower cladding (substrate cladding 201) of silicon dioxide ($SiO_2$) and can be grown using low pressure chemical vapor deposition techniques on a silicon substrate.

In optical parametric oscillator 200, the optical parametric oscillation mechanism is based on cavity-enhanced degenerate four-wave mixing, a nonlinear optical process in which pump coherent light 205 is injected at a pump wavelength (at pump frequency $v_p$) that is converted to signal and idler wavelengths (respectively at signal frequency $v_s$ and idler frequency $v_i$), subject to energy and momentum conservation. The process for producing idler coherent light 206 and signal coherent light 207 from pump coherent light 205 by optical parametric oscillator 200 that has balanced parametric dispersion 210 involves dispersion of microring resonator 204 (cavity and resonator are used interchangeably here) to support a pair of widely-separated signal and idler wavelengths (for idler coherent light 206 and signal coherent light 207). The choice of wavelengths can be broadly tuned by adjusting the geometry (cross-section of microring resonator 204) and the pump wavelength of pump coherent light 205. The nanophotonic microring resonator 204 has high optical quality factors (low loss) and small modal volumes (strong optical field confinement), which together provide a threshold power less than or equal to the one milliwatt level.

Optical parametric oscillator 200 can be made by scalable manufacturing based on silicon photonics so that pump coherent light 205 produces outputs (206, 207) that are widely separated. Optical parametric oscillator 200 covered visible and telecommunications wavelengths using a near-infrared pump with coarse tuning and fine tuning of wavelengths of output occur by adjustment to geometry of microring resonator 204. Moreover, optical parametric oscillator 200 is very power efficient. The threshold power of pump coherent light 205 for producing idler coherent light 206 and signal coherent light 207 is at the sub-mW level, which is 50 times smaller than conventional devices. With such small power consumption, optical parametric oscillator 200 can be directly integrated with on-chip or compact pump lasers that provide pump coherent light 205 that can operate in the near-infrared. Further, optical parametric oscillator 200 produces idler coherent light 206 and signal coherent light 207 with sub-mW power of pump coherent light 205 in an absence of an intermediate amplifier as a considerable practical benefit.

Optical parametric oscillator 200 solves the problem of on-chip generation of coherent laser light at frequencies for which suitable laser gain media do not exist or do not perform very well. Optical parametric oscillator 200 has relevance in context of integrated photonics, where technology is being built to enable routing and manipulation of light on a chip, including at visible wavelengths for atomic systems used as wavelength references and clocks. Spectroscopy and sensing of biochemical systems on a chip that is an area of use for optical parametric oscillator 200 in which optical parametric oscillator 200 is combined with integrated photonics and microfluidics. Advantageously, optical parametric oscillator 200 converts near-infrared or telecom wavelengths to visible light and retains coherence properties associated with lasers while operating at a wavelength relevant to the aforementioned applications.

Optical parametric oscillator 200 can be made in various ways. In an embodiment, a process for making optical parametric oscillator 200 includes: depositing substrate cladding 201, e.g., forming 3-µm thick silicon dioxide by thermal oxidation of a silicon wafer. Optionally, substrate cladding 201 can be provided by a uniform material of properties described earlier, e.g., a fused silica or quartz substrate. The process also includes depositing the material including microring resonator 204 and waveguide 203, e.g., stoichiometric silicon nitride ($Si_3N_4$) via low pressure chemical vapor deposition; spin coating and patterning of electron-beam resist via electron beam lithography to create the resonator and waveguide shapes in the electron-beam resist layer; transferring of pattern from electron-beam resist into the microring 204 and waveguide 203 material via reaction ion etching; removing electron-beam resist; cleaning of sample using solvents (e.g., acetone, methanol, isopropanol) or acids (e.g., sulfuric acid, hydrogen peroxide) as selected; depositing cover cladding layer as desired; and optionally separating starting substrate into chips and preparing facets (e.g., via cleaving, reactive ion etching, or dicing and polishing) to enable edge coupling via optical fibers.

The process for making optical parametric oscillator 200 also can include wet etching to thin microring 204 or waveguide core layer 203 to a select thickness. Trimming can occur after initial film deposition or after dry etching and resist removal, e.g., prior to depositing cover cladding 202. Post-fabrication annealing in an $N_2$ or $O_2$ environment at 1100° C. for 3 hours can occur to limit absorption losses in the deposited materials. This can be performed prior to deposition of the cover cladding layer or after deposition of the cover cladding layer. Electron-beam lithography can be substituted by photolithography with adequate resolution to define the desired features, e.g., 193 nm or 248 nm deep UV lithography, often provided by a step and repeat tool, which is referred to as a stepper.

In an embodiment, a process for producing idler coherent light 206 and signal coherent light 207 from pump coherent light 205 using optical parametric oscillator 200 includes using a pump laser source whose frequency matches pump frequency 214, wherein a laser linewidth is narrower than the optical cavity mode linewidth in the pump frequency band; confirming that pump laser light is coupled into a mode of the cavity by tuning the pump laser frequency to produce a dip in pump transmission signal carried by waveguide 203; adjusting the frequency of the pump laser to be within the pump transmission dip; increasing the pump power to be greater than the threshold value $P_{in}$, such that if conditions for balanced parametric dispersion and threshold are satisfied, optical parametric oscillator 200 produce idler coherent light 206 and signal coherent light 207; and optionally optimizing the pump frequency based on maximizing generated signal coherent light 207.

Optical parametric oscillator 200 has numerous advantageous and unexpected benefits and uses. In an embodiment, a process producing idler coherent light 206 and signal coherent light 207 from pump coherent light 205 with optical parametric oscillator 200 includes: receiving pump coherent light 205 by waveguide 203; communicating pump coherent light 205 from waveguide 203 to microring resonator 204; and producing idler coherent light 206 and signal coherent light 207 from pump coherent light 205 according to balanced parametric dispersion 210 of microring resonator 204. According to an embodiment, the process further includes receiving, by second waveguide 203.2 in optical communication with microring resonator 204 and including silicon nitride, idler coherent light 206 and signal coherent light 207 from microring resonator 204.

Additional steps can be performed in producing idler coherent light 206 and signal coherent light 207 with optical parametric oscillator 200. Such steps can include injection locking of a pump laser producing coherent pump light 205. Here, a chip-based Fabry-Perot laser diode is butt-coupled to the optical parametric oscillator chip. Optical feedback provided by resonant backscattering from the microring will injection lock the pump laser at a frequency matching the microring resonator pump mode frequency, thereby selecting a single frequency output from the multimode Fabry-Perot laser that is automatically aligned with the microring resonator pump mode. This process alleviates the need to fine tune the pump laser frequency to match the microring resonator pump mode frequency.

It should be appreciated that idler coherent light 206 and signal coherent light 207 can be used for applications such as spectroscopy of visible wavelength atomic or atomic-like systems, including warm atomic vapors, cold atom systems, quantum dots, nitrogen vacancy centers in diamond, and semiconductor quantum dots. Here, the microring resonator dispersion is chosen to create optical parametric oscillator 200 in which either idler coherent light 206 or signal coherent light 207 is spectrally resonant with the known optical transition frequency of one of the above systems. Feedback to the optical parametric oscillator to tune the signal coherent light 207 or idler coherent light 206 and lock its frequency to the atomic or atomic-like transition can be achieved through temperature control of the optical parametric oscillator chip.

Optical parametric oscillator 200 and processes disclosed herein have numerous beneficial uses that include producing output optical frequencies (i.e., idler coherent light 206 and signal coherent light 207) that can be situated anywhere within an exceptionally broad range of frequencies that is fundamentally only limited by energy conservation required by the underlying four-wave mixing process. It is contemplated that a Kerr nonlinear resonator pumped at a frequency of 380 THz can produce signal frequencies anywhere between slightly above 380 THz and as high as almost 760 THz. Material constraints (e.g., absorption at certain wavelengths) can limit a maximum output frequency to 650 THz under certain conditions. Actual frequencies produced can depend on the balanced dispersion profile and in particular the positions of the zero crossing points, nodes (216, 219), which are adjustable based on microring 204 geometry (thickness H, width W, and radius R). Coherent light can be generated over a range of frequencies that is much broader than conventional semiconductor laser materials. In an embodiment, a single chip is fabricated with optical parametric oscillator devices made of a single material and that produces green, yellow, orange, and red colors. It should be appreciated that such is not provided with conventional semiconductor laser technologies. Advantageously, optical parametric oscillator 200 overcomes limitations of technical deficiencies of conventional compositions such as the aforementioned semiconductor lasers and optical parametric oscillator based on the second-order optical nonlinearity. The former produces coherent light in a wavelength range dictated by their electronic bandgap such that multiple materials are combined for a wide wavelength range to be covered. The latter requires a pump frequency that is equal to the sum of the signal frequency and idler frequency, which can be at ultraviolet wavelengths for which many Kerr nonlinear media are absorbing.

Conventional direct laser generation on-chip is limited by availability and spectral bandwidth of laser gain media, which is overcome by optical parametric oscillator 200. Various types of chip-integrated visible wavelength lasers are available but are not as broadly tunable as optical parametric oscillator 200. Moreover, conventional optical parametric oscillator technology lack wide spectral separation between signal and idler as compared with optical parametric oscillator 200 even though the conventional technology is based on silicon photonics. Because silicon is a technologically mature fabrication platform accessible through foundry facilities, optical parametric oscillator 200 has a relatively low cost of production and enjoys scalable fabrication processes with integration into systems. Optical parametric oscillator 200 can include sub-mW pump power for on-chip or compact integration with a near-infrared pump laser. Integration with a compact near-infrared pump laser provides near readily available conversion of near infrared light to visible with optical parametric oscillator 200.

Optical parametric oscillator 200 and processes herein generate coherent light at optical frequencies that are not commonly available in integrated photonic chip platforms. For example, visible coherent light can be generated from a near-infrared coherent pump.

The articles and processes herein are illustrated further by the following Examples, which are non-limiting.

EXAMPLES

Example 1

Milliwatt-Threshold Visible-Telecom Optical Parametric Oscillation Using Silicon Nanophotonics The on-chip creation of coherent light at visible wavelengths is crucial to field-level deployment of spectroscopy and metrology systems. Although on-chip lasers have been implemented in specific cases, a general solution that is not restricted by limitations of specific gain media has not been reported, to the best of our knowledge. Here, we propose creating visible light from an infrared pump by widely separated optical parametric oscillation (OPO) using silicon nanophotonics. The OPO creates signal and idler light in the 700 nm and 1300 nm bands, respectively, with a 900 nm pump. It operates at a threshold power of (0.9±0.1) mW, over 50× smaller than other widely separated microcavity OPO works, which have been reported only in the infrared. This low threshold enables direct pumping without need of an intermediate optical amplifier. We further show how the device design can be modified to generate 780 nm and 1500 nm light with a similar power efficiency. Our nanophotonic OPO shows distinct advantages in power efficiency, operation stability, and device scalability, and is a major advance towards flexible on-chip generation of coherent visible light.

On-chip generation of coherent light at visible frequencies is critical for miniaturization and field-level deployment for spectroscopy and metrology, e.g., wavelength-stabilized reference lasers based on atomic vapors and optical atomic clocks. One approach is to develop on-chip lasers directly using III-V semiconductors, but the wavelength coverage is limited by the available gain media and requires nontrivial heterogeneous integration to be compatible with a silicon chip. Another approach is to use nonlinear optics to create light at new frequencies from existing lasers. There are many second/third-order ($\chi^{(2)}/\chi^{(3)}$) nonlinear optical processes for this purpose, including optical parametric oscillation (OPO), second/third-harmonic generation (SHG/THG), sum frequency generation (SFG), and stimulated four-wave mixing/optical parametric amplification (StFWM/OPA). Among these processes, OPO is uniquely suitable to generate coherent light over a wide spectral range, because the generated light is not limited to harmonics of pump frequencies (unlike SHG/THG), and only one pump laser is required (unlike SFG/StFWM/OPA). Historically, $\chi^{(2)}$ OPO has been particularly efficient in creating coherent light across wide spectral ranges. Half a century ago, coherent OPO light from 970 nm to 1150 nm was generated by a 529 nm pump laser in a LiNbO$_3$ crystal. Later, the OPO signal wavelength was brought into the visible (from 537 nm to 720 nm) by a 308 nm pump laser in a BaB$_2$O$_4$ crystal. Nowadays, $\chi^{(2)}$ OPO systems have become a laboratory workhorse tool in the generation of coherent, tunable visible light, particularly when pumped by a Ti:sapphire laser. However, nanophotonic implementations of OPO that can reach visible wavelengths are still lacking.

In this Example, a nanophotonic $\chi^{(3)}$ OPO for on-chip visible light generation is described. We use $\chi^{(3)}$ rather than $\chi^{(2)}$ for two important reasons. First, $\chi^{(3)}$ processes, unlike $\chi^{(2)}$ processes, are naturally compatible with silicon photonics. Second, as the $\chi^{(3)}$ OPO consumes two pump photons for each generated signal/idler pair, visible wavelengths can be reached through an easily available infrared pump laser, in contrast to a $\chi^{(2)}$ OPO, which needs a UV pump laser. Although ideas for how to achieve widely separated $\chi^{(3)}$ OPO have been demonstrated in photonic-crystal-fiber-based systems and then introduced to silicon nanophotonics theoretically over a decade ago, because of the challenging dispersion engineering requirements, such nanophotonic OPO has not been experimentally demonstrated. This is in contrast to other wide-band nonlinear processes, e.g., nanophotonic SHG/THG, which have been extensively reported. Recently, widely separated OPO has been achieved in whispering-gallery mode (WGM) platforms with larger footprints, including crystalline MgF$_2$ microcavities and SiO$_2$ microtoroids, but the threshold powers are relatively large, and the spectra of the OPO output have been restricted to the infrared.

To demonstrate nanophotonic visible telecom OPO, we use the silicon nitride (Si$_3$N$_4$) platform, whose advantageous characteristics for silicon-based nonlinear nanophotonics, including octave-spanning frequency combs, frequency conversion/spectral translation, entanglement generation and clustered frequency comb generation, have by now been well established. Here we show, for the first time, on-chip OPO with signal and idler at visible and telecom frequencies, e.g., 419.8 THz (714.6 nm) and 227.8 THz (1316.9 nm), respectively. The OPO process is power efficient due to nanophotonic confinement and strong spatial mode overlap, and has an ultra-low threshold power of (0.9±0.1) mW. In contrast to recent microresonator OPO works that use between 50 mW and 380 mW of pump power to achieve widely separated signal and idler in the infrared, our devices use only milliwatt-level power, without intermediate optical amplifiers, to achieve widely separated signal and idler in the visible and telecom, respectively. We further show that the OPO frequencies can be readily controlled by changing the device geometry. In particular, we demonstrate OPO with signal and idler at 383.9 THz (781.4 nm) and 202.1 THz (1484 nm), respectively, by pumping at 293.0 THz (1024 nm). This signal wavelength is suitable for rubidium vapor, and the pump wavelength is accessible from compact semiconductor chip lasers.

Our OPO devices are based on cavity-enhanced degenerate FWM (dFWM), which involve conservation of both momentum and energy for the interacting optical modes. For the same mode family, momentum conservation is simplified to conservation of the azimuthal mode number, i.e., $\Delta m = m_s + m_i - 2m_p = 0$, where the subscripts s,i,p denote signal, idler, and pump, respectively. Energy conservation requires the central frequencies of the cavity modes to have a mismatch ($\Delta v = v_s + v_i - 2v_p$) within the cavity linewidths, i.e., $|\Delta v| < v_k/Q_k$, where k=s, i, p, and $Q_k$ is the loaded quality factor for the k mode. We note that achieving such phase and frequency matching across visible and telecom bands has been demonstrated in silicon nanophotonics only for photon-pair generation and spectral translation, where a mode-splitting approach enables the identification of specific azimuthal modes separated by hundreds of THz. We employ a similar approach here, focusing on fundamental transverse electric (TE1) modes only, which have high-Q, strong modal confinement (V$^-$), and good mode overlap ($\eta$). These attributes are involved for achieving low-threshold operation.

However, the above design principles do not guarantee that the targeted wide-band OPO process will occur. The process also can win over all other competing processes that are matched in phase and frequency, including OPO in the pump band, clustered frequency combs in the signal and idler bands, and other nonlinear processes (e.g., stimulated Raman scattering and THG). Some report telecom-to-visible spectral translation via stimulated dFWM did not exhibit widely separated OPO, because without the seed telecom light, close-to-pump OPO processes dominate. Thus, unlike previous work in wide-band silicon nonlinear nanophotonics, visible-telecom OPO faces a more stringent requirement not only on enhancing the process of interest, but also on suppressing all competing processes at the same time.

In particular, OPO in the pump band can be suppressed if the pump modes are in the normal dispersion regime, which corresponds to a negative dispersion parameter (D).

$$D = -\frac{\lambda}{c} \frac{d^2 n}{d\lambda^2}.$$

where c, $\lambda$, and n$^-$ represent the speed of light, vacuum wavelength, and effective mode index, respectively. D<0 is equivalent to $\Delta v < 0$ when the signal and idler modes are near the pump mode. Therefore, we need to design the device to have $\Delta v < 0$ when signal and idler are near the pump, and $\Delta v = 0$ when signal and idler are widely separated.

Figure 7:
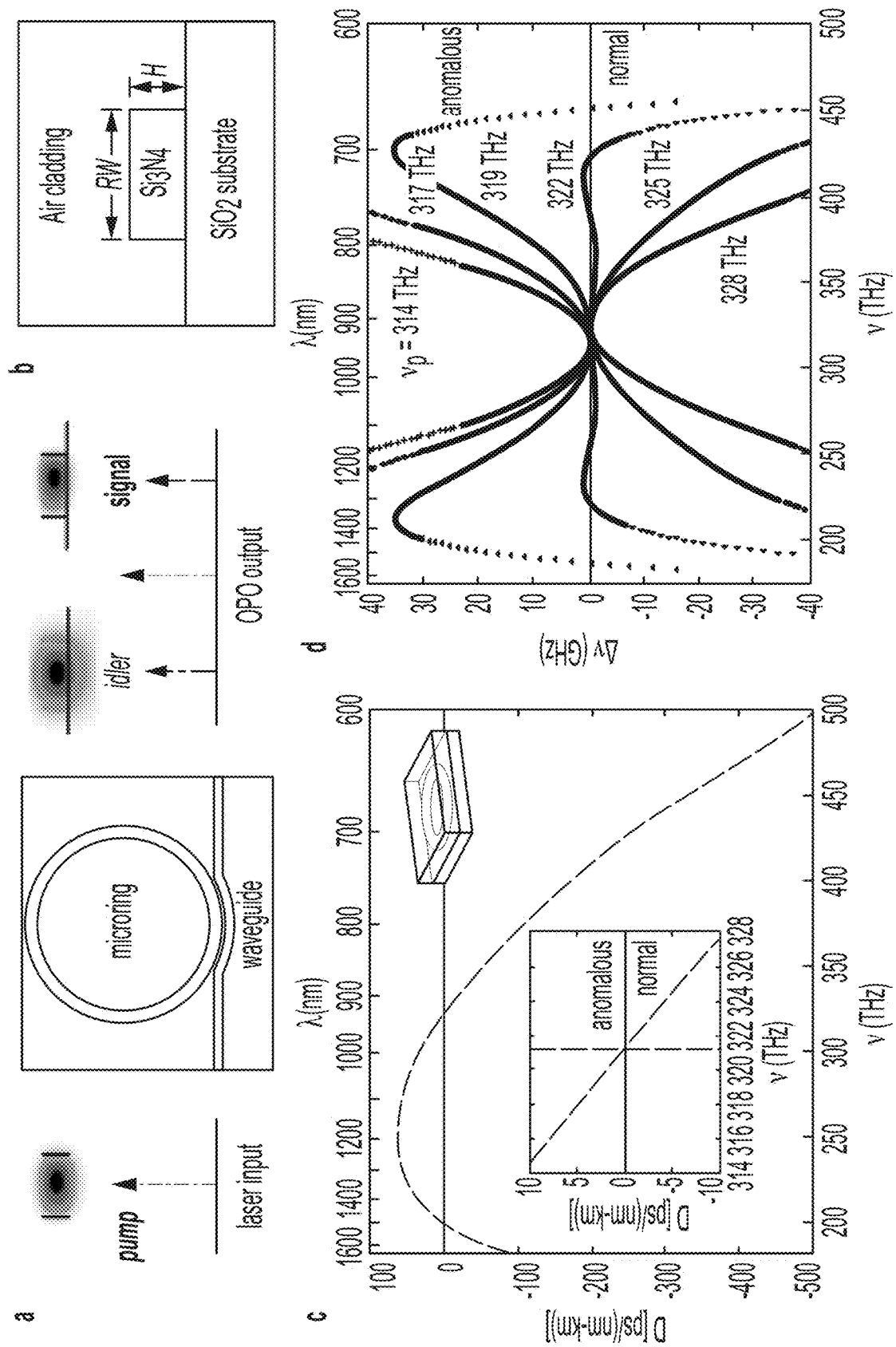
FIG. 7 shows a nanophotonic visible-telecom optical parametric oscillator. (a) Schematic indicating that the microring device uses cavity-enhanced degenerate four-wave mixing (dFWM) to generate signal and idler light that have frequencies widely separated from the input pump. All interacting modes (pump, signal, and idler) are fundamental transverse-electric modes (TE1), with their dominant electric field components shown in insets. The input pump and the output signal and idler are all coupled with the same waveguide in this scheme. (b) Cross-section view of the microring shows the air cladding and silicon dioxide substrate, and two key geometric parameters, ring width (RW) and height (H). These two parameters, together with the ring outer radius (R), unambiguously determine the microring dispersion. (c) Dispersion curve (D) of a typical geometry, with R=23 μm, RW=1160 nm, and H=510 nm. D=0 when the pump frequency $v_p$ is ≈321.7 THz (932.5 nm), as shown in the zoomed-in inset. The dispersion is anomalous (D>0) when $v_p$ is smaller, and normal (D<0) when $v_p$ is larger. (d) Frequency mismatch (Δv) for dFWM for the geometry in (c) at various values of $v_p$. When the pump is slightly normal at 322 THz (red), there are two cases in which signal and idler modes are phase/frequency matched, with both suitable for widely separated OPO. Δv is calculated for specific mode number (m) sets, because dFWM requires the phase-matching condition to be satisfied, i.e., $m_s+m_i=2m_p$. The mode frequency for each mode number is calculated for the geometry in (c) by the finite-element method.

We use the aforementioned design principles to guide numerical simulations for the widely separated OPO. FIG. 7(b) shows a cross-sectional view of the microring. The Si$_3$N$_4$ core has a rectangular cross section, described by ring width (RW), thickness (H), and ring radius (RR). We use these parameters to tailor the geometric contribution to the dispersion. We note that self-/cross-phase modulation is negligible in our device, so that we can use the natural cavity frequencies to design our OPO.

FIG. 7(c) shows the dispersion parameter of a device with RW=1160 nm, H=511.0 nm, and RR=23 µm, where the zero-dispersion frequency (ZDF) is at ≈321 THz. The dispersion is anomalous for smaller frequencies and normal for larger frequencies. The frequency mismatch (Δv) is plotted [FIG. 7(d)] with pump frequency ($v_p$) ranging from 314 THz to 328 THz. When $v_p$=322 THz, nearby modes show an overall small normal dispersion, and there are two widely separated mode pairs that are frequency matched (Δv=0). In contrast, larger values of vp have large normal dispersion and do not lead to widely separated OPO. Smaller $v_p$ may allow widely separated OPO (e.g., 319 THz case), but the anomalous dispersion around the pump results in several close-band competitive OPO processes, making widely separated OPO unavailable in general.

We also simulate devices that have different RW but the same RR and H, with the dispersion plotted in FIG. 8a), When RW increases from 1140 nm to 1160 nm, the ZDF red shifts from 325 THz to 321 THz, remaining within our laser scanning range. We thus have a prescription for geometries to experimentally observe the transition from close-band to widely separated OPO processes.

We fabricate devices as described below with fixed H and varying RW, and characterize them as a function of $v_p$ near the ZDF. The results are summarized in FIG. 8(b) and FIG. 8(c). The output OPO spectra are recorded by an optical spectrum analyzer (OSA), while the pump is scanned for modes that transit from anomalous to normal dispersion, with an example in FIG. 8(c) for fixed RW=1150 nm. The OPO signal and idler frequencies for all RW and $v_p$ are then plotted in FIG. 8(b), $v_p$ for OPO with the widest separation red shifts from 327.8 THz (RW=1160 nm) to 325.7 THz (RW=1150 nm) and 323.8 THz (RW=1140 nm), following the shift in device dispersion. Focusing again on the RW=1150 nm spectra for several different $v_p$ [FIG. 8(c)], we clearly observe the trend predicted previously when tuning $v_p$ from anomalous to normal. When the pump dispersion is anomalous, OPO signal and idler bands are closely spaced around the pump [top panel in FIG. 8(c)]. When the pump dispersion is slightly normal, the OPO signal and idler have increasingly large spectral separation as $v_p$ increases [second to fourth panels in FIG. 8(c)]. However, when the pump dispersion is too normal, no widely separated OPO is observed, and only very close-band OPO is seen [bottom panel in FIG. 8(c)]. The RW=1160 nm device [red in FIG. 8(b)] has a similar trend but fewer pumping modes in the transition to the slightly normal region. This trend agrees with the prediction in FIG. 7(d), although the experimental $v_p$ is 2 THz larger than predicted, which is likely due to uncertainties in device fabrication.

Figure 9:
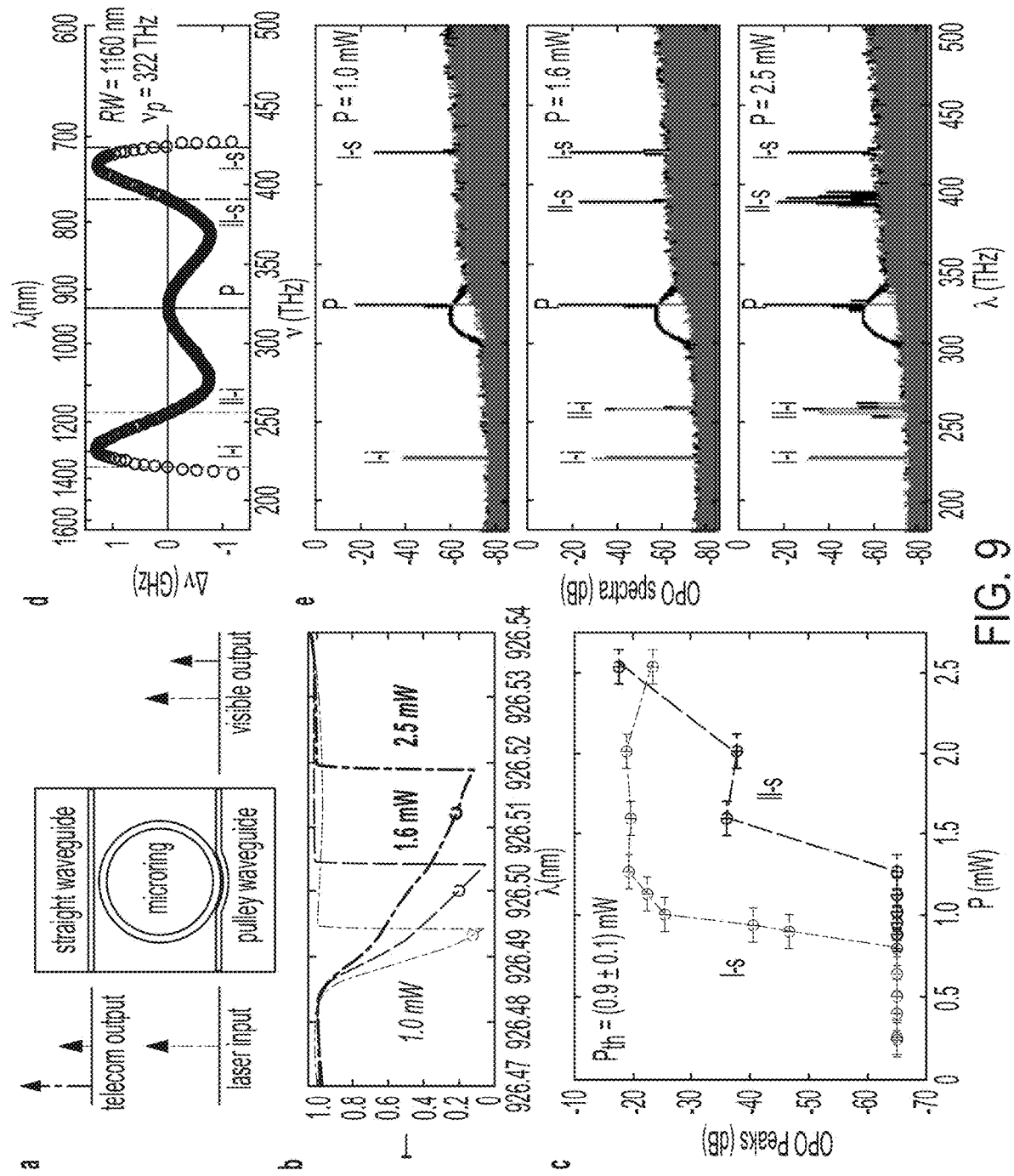
FIG. 9 shows power dependence of the visible telecom OPO. (a) When the OPO frequencies are separated widely into the visible-telecom regime, two waveguides are needed to couple the visible and telecom light efficiently. The straight waveguide (top) is used for out-coupling the telecom (idler), and the pulley waveguide (bottom) is for out-coupling the visible (signal). (b) Transmission (T) traces for $v_p$≈322 THz show bistabilities with various pump powers (P). The open circles specify the laser detuning at various powers for the OSA spectra in (e). (c) OPO threshold power is only (0.9±0.1) mW, measured by the power dependence of the OPO signal peak amplitudes. I-s and II-s denote signal peaks of two OPO tones at 419.8 THz and 388.7 THz in (e). Here, on the y axis, 0 dB is referenced to 1 mW, i.e., dBm. Error bars are one standard deviation values due to fluctuations in optical path losses. The quoted pump power is on-chip, with the facet loss typically between 2 dB and 3 dB. (d) Zoom-in frequency mismatch curve for two phase-/frequency-matched cases, where the signal/idler frequencies are labeled as I-s/I-i and II-s/II-i, respectively. The pump frequency is labeled as p (around 322 THz). (e) OPO spectra as a function of pump power. When the pump power is 1.0 mW, OPO I is above threshold and OPO II is below threshold, with I-s and I-i located around 419.8 THz (714.6 nm) and 227.8 THz (1316.9 nm), respectively, corresponding to a spectral separation of 192 THz. Next, when the pump power is 1.6 mW, both OPO I and II are above threshold and observable in the spectrum. II-s and II-i are located around 388.7 THz (771.8 nm) and 258.8 THz (1159.2 nm), respectively. The frequencies of both OPO I/II agree reasonably well with the theoretical prediction in (d). Finally, when the pump power is 2.5 mW, close-band FWM adjacent to OPO II is excited, because the modes adjacent to II have smaller frequency mismatch compared to those around I, as indicated by (d). On the yy axis, 0 dB is referenced to 1 mW, i.e., dBm.

We focus on the RW=1160 nm device and study its power dependence at $v_p$=322 THz in FIG. 9. The OPO signal and idler have a spectral separation that is too large for a single waveguide [FIG. 7(a)] to out-couple both frequencies efficiently. We therefore use two waveguides to separate the coupling tasks, as shown in FIG. 9(a). The bottom pulley waveguide couples the pump and signal light together, while being cutoff at telecom wavelengths. The top waveguide couples telecom light efficiently, but does not couple the pump and signal light due to a limited spatial overlap that prevents effective evanescent coupling. The combined coupling geometry is designed to have coupling Q=(1–2)×$10^6$ for pump, signal, and idler modes. In experiment, we verify that the fabricated device has intrinsic Q=(2–3)×$10^6$ and loaded Q≈1×$10^6$ for TE1 modes in the pump band, which corresponds to loaded cavity linewidths of ≈300 MHz. With such high Q, the device shows large thermal bistability at milliwatt pump powers, as shown in FIG. 9(b). For each pump power, we situate the pump detuning near the dip of the cavity resonance and measure the generated OPO spectrum. Three representative spectra are shown in FIG. 9(e), with pump detuning indicated by the open circles in FIG. 9(b). For 1 mW pump power at $v_p$=323.8 THz (926.5 nm), the top panel in FIG. 9(e) shows that a widely separated OPO is generated with signal at 419.8 THz (714.6 nm) and idler at 227.8 THz (1317 nm). The signal-idler separation is 192 THz, comparable to the largest reported value for WGM resonators (≈230 THz), where the idler frequency was inferred (signal and idler were both in the infrared). With an increased pump power of 1.6 mW, an additional pair is generated at 388.8 THz (771.6 nm) and 258.8 THz (1187 nm), as shown in the middle panel in FIG. 9(e). With a further increase in pump power to 2.5 mW, clustered combs are generated around the second signal-idler pair, while the first pair remains unaccompanied by other spectral tones [bottom panel in FIG. 9(e)].

These two OPO pairs measured in experiment agree quite well with the theoretical predictions [FIG. 9(d)], where pair I is predicted to be at 423 THz (I-s) and 221 THz (I-i) and pair II at 389 THz (II-s) and 255 THz (II-i). The m numbers of these modes are {420, 383, 310, 237, 200} for {I-s, II-s, p, II-i, I-i} [labeling scheme in FIG. 9(d)]. These mode numbers clearly satisfy phase matching (Δm=0). Moreover, the fact that the clustered comb is generated in the II pair, but not in the I pair, is not coincidental and can be explained as follows. All the mode pairs satisfying phase matching are plotted in FIG. 9(d). Each mode is represented by an open circle, and the cavity free spectral range (FSR) is ≈1 THz. Although both I and II satisfy frequency matching, the densities of mode pairs (within a given range of frequency mismatch) around I and II are different. Because material dispersion is much larger at higher frequencies, the I pair exhibits larger dispersion and has sparser modes in the neighborhood of the tolerated frequency mismatch, which can be estimated by the cavity linewidth (≈300 MHz). In other words, the modes near II are preferred for clustered comb generation considering both mode density and frequency matching. Moreover, because of the normal dispersion around the pump, there are no competitive processes in the pump band even at higher pump power [FIG. 9(e)]. A power-dependence study [FIG. 9(c)] indicates a threshold of (0.9±0.1) mW for the first set of OPO lines. The second OPO has a threshold of (1.5±0.2) mW, while its subsequent clustered frequency comb has a threshold near 2.5 mW.

For applications, the delivered output power of the OPO is an important metric. In our devices, the typical OPO signal and idler fields are 10 dB to 20 dB lower than the pump [FIG. 9(e)]. While this is actually better than previous widely separated OPO works (where the signal and idler are 30 dB to 50 dB lower than the pump [20,21]) and not uncommon for microcavity OPOs regardless of spectral separation (e.g., ≈15 dB difference in Ref. [32]), improving the conversion from pump to signal is nevertheless important. To do so, we anticipate that more advanced coupling engineering is needed to increase the out-coupling efficiency. While this will generally result in a higher threshold power, depending on the application, an appropriate balance can be struck between output power (e.g., for the visible wavelength signal) and overall power efficiency.

Although close-band OPO with spectral tones near the pump are successfully suppressed, the generation of two OPO pairs with pair II eventually exhibiting a cluster of tones might be unwanted in applications. Here, we show how the ring geometry can be tuned to achieve a dispersion that supports only one single set of widely separated OPO tones.

Figure 10:
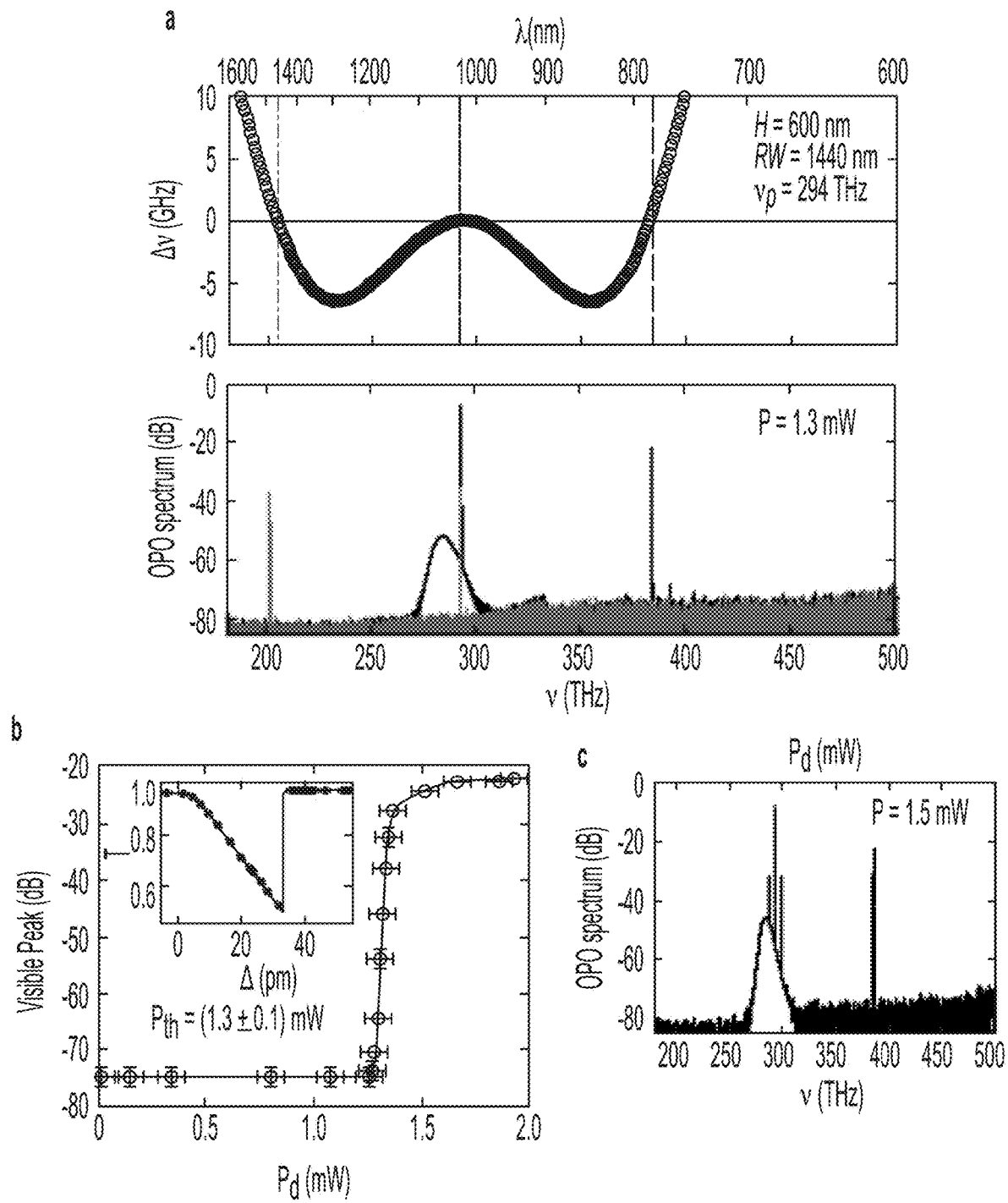
FIG. 10 shows OPO on a single widely separated pair. (a) Top panel shows a microring design with only one phase-/frequency-matched widely separated OPO pair. The microring has parameters of H=600 nm and RW=1440 nm. When the pump laser frequency $v_p$=293.5 THz, the generated OPO is predicted to have only a single pair with frequencies of 205 THz and 382 THz. The bottom panel shows the experimental optical spectrum, which confirms that only a single widely separated pair is generated at 202.1 THz (1484 nm) and 383.9 THz (781.4 nm) when vp≈293.0 THz vp=293.0 THz (1024 nm). Due to the large spectral separation, the device needs two waveguides to couple the OPO signal and idler, with spectra shown in red and blue, respectively. (b) Threshold study of the OPO pair with various dropped pump powers Pd=P(1−T), where transmission (T) is changed by the laser-cavity detuning (Δ), as shown in the inset. The threshold power is (1.3±0.1) mW. (c) Dispersion is normal near the pump, as shown in (a), thereby disfavoring close-band OPO. However, when the pump power is sufficiently above threshold, the close-band OPO process begins to appear. This competitive OPO is much less efficient than the widely separated OPO, but nevertheless needs further suppression for ideal operation. In the yy axes of (b) and (c), 0 dB is referenced to 1 mW, dBm.

We calculate the device dispersion and OPO frequency mismatch for various ring widths using mode frequencies from finite-element method (FEM) simulations. The top panel in FIG. 10(*a*) shows the key result where the device with RW=1440 nm is predicted to generate a visible telecom OPO with signal and idler located at 384 THz (781 nm) and 204 THz (1470 nm), respectively, for a pump at 294 THz (1020 nm). This H=600 nm design has widely separated frequency-/phase-matching mode pairs and normal dispersion near the pump, similar to the previous H=510 nm design [FIG. 9(*d*)]. However, the H=600 nm design supports only one widely separated OPO pair, and is also ≈5× more dispersive in the frequency bands of interest. These two properties together make this design better in suppressing competitive OPO processes. In the measured optical spectrum [bottom panel in FIG. 10(*a*)], the fabricated device generates OPO with signal and idler at 383.9 THz (781.5 nm) and 202.1 THz (1484 nm), respectively, when pumping at 293.0 THz (1023.9 nm) with 1.3 mW pump drop power. The measured frequencies agree with theoretical prediction within 2 THz for all three modes. Moreover, only one pair of widely separated tones is generated, as the simulation predicts. We note that the short wavelength OPO output is suited for spectroscopy of rubidium vapor (1.5 nm wavelength tuning needed), and the telecom OPO output makes such a device potentially suitable for spectral translation. We also note that in FIG. 10(*c*), a small close-to-pump OPO is generated at 1.5 mW pump drop power. Such close-band OPO is ≈10 dB smaller than the widely separated OPO and occurs when the pump is depleted. The pump depletion effectively broadens the cavity linewidth (acts as another effective loss channel), thereby enabling the close-band OPO to occur.

One property of our device is its operation stability, i.e., OPO works at a continuous detuning of the pump. This stability has not been demonstrated in prior works, where large pump power is used to assist phase matching, and clean OPO pairs typically require sensitive pump detuning. In some conventional devices, a cluster frequency comb is clearly in competition with the clean OPO pair when the detuning changes. In contrast, our OPO has stable output frequencies. We study this stability by recording the peak amplitude of the 781.5 nm signal versus the pump power dropped inside the microring [FIG. 10(*b*), inset]. The pump threshold power is (1.3±0.1) mW, similar to, but slightly larger than, that of the previous design. In particular, we observe only one widely separated OPO pair throughout this detuning process, until at the highest dropped powers, one close-band OPO occurs [FIG. 10(*c*)]. Importantly, such close-band OPO, although affecting the output power for the targeted widely-separated OPO, does not come with clustered frequency combs near the signal and idler. We note that some coupling designs can suppress the close-band OPO.

Figure 8:
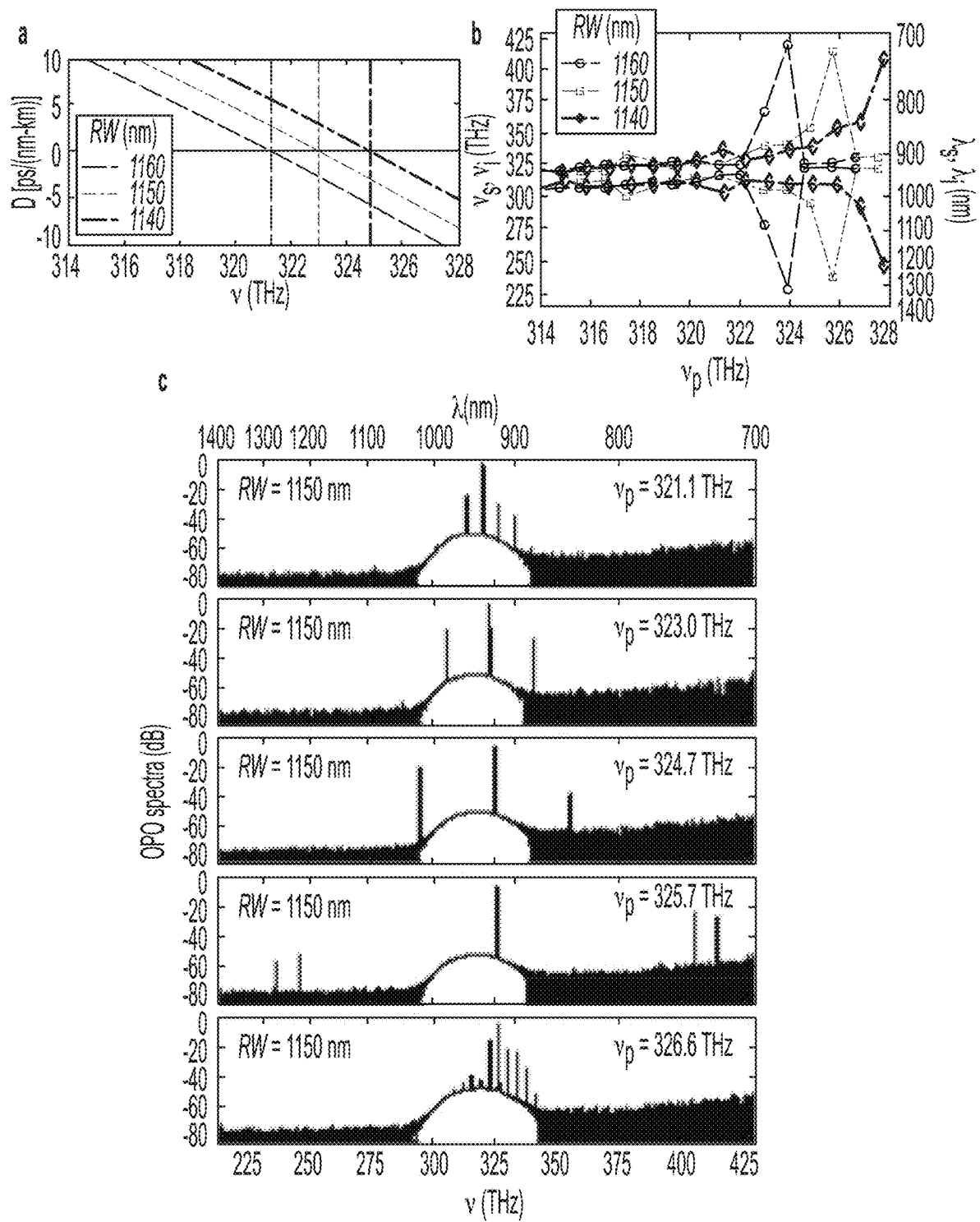
FIG. 8 shows OPO frequencies critically depend on ring width (RW) and pumping frequency ($v_p$). (a) Simulated dispersion (D) curves for different RW. The zero-dispersion frequency (ZDF) blue shifts with decreasing RW. (b) Experimentally recorded OPO output (signal and idler) frequencies (left axis, $v_s$ and $v_i$) and wavelengths (right axis, $\lambda_s$ and $\lambda_i$) of the aforementioned geometries when $v_p$ is varied around the ZDF. Widely separated OPO occurs when the dispersion is slightly normal because potential close-band OPO processes are inhibited. (c) OPO spectra for the RW=1150 nm device when $v_p$ is varied. When scanning $v_p$ from a mode in the anomalous region to one in the normal region, the spectral separation of the OPO signal and idler increases from 9 THz to 37 THz, 61 THz, and 178 THz, and finally decreases to 7 THz (from top to bottom). On the y axis, 0 dB is referenced to 1 mW, i.e., dBm.

The stability can be attributed to three factors. First, our device has a smaller size and thus an FSR of ≈1 THz that conventional devices that can have larger size and an FSR of ≈100 GHz to 300 GHz. Second, because of the larger material dispersion at the visible wavelength and larger geometric dispersion of the nanophotonic devices, the modes around OPO pairs are more dispersive and therefore less prone to clustered frequency combs. Our devices have smaller operation powers and thus smaller parametric gain bandwidths, which further limits the allowable number of competitive OPO processes. Such superior power efficiency and operation stability comes with a sacrifice of frequency tunability. For example, our results typically show only a few pump modes that can generate widely separated OPO, as shown in FIG. 8(*b*), while conventional works can possess ≈10× more pump modes for such operation. We note that the frequency tunability can be aided with pump power tuning but not temperature tuning.

In summary, the visible telecom OPO had silicon nanophotonics, with a signal-idler spectral separation of ≈190 THz, and a sub-mW threshold power that is two orders of magnitudes smaller than conventional infrared OPO. Our demonstration represents an advance for on-chip generation of coherent visible light. Compatibility with silicon photonics and its accompanying potential for low-cost, scalable fabrication make our approach particularly promising for integrated photonics applications.

Optical parametric oscillation (OPO) in high-Q microresonators are considered with an estimate of threshold power as a function of the cavity decay rates and effective nonlinearity including mode overlap. In particular, cases where signal, pump, and idler can be quite different in frequency are considered. In high-Q microresonators, because light propagates many round trips before being lost (e.g., scattering or absorption) or appreciably coupled out from the cavity, we can treat the loss and coupling as if they are uniformly distributed in time and space. The slowly varying light fields satisfy the following equations.

$$\frac{d\tilde{A}_p}{dt} = (i\Delta\omega_p - \Gamma_{tp}/2)\tilde{A}_p + i(\gamma_p U_p + 2\gamma_{ps}U_0 + 2\gamma_{pi}U_i)\tilde{A}_p + 2i\gamma_{pspi}\tilde{A}_s\tilde{A}_i\tilde{A}_p^* + i\sqrt{\Gamma_{cp}}\,S_{in}, \quad (S1)$$

$$\frac{d\tilde{A}_s}{dt} = (i\Delta\omega_s - \Gamma_{ts}/2)\tilde{A}_s + i(\gamma_s U_s + 2\gamma_{sp}U_p + 2\gamma_{si}U_i)\tilde{A}_s + i\gamma_{spip}\tilde{A}_p^2\tilde{A}_i^*, \quad (S2)$$

$$\frac{d\tilde{A}_i}{dt} = (i\Delta\omega_i - \Gamma_{ti}/2)\tilde{A}_i + i(\gamma_i U_i + 2\gamma_{ip}U_p + 2\gamma_{is}U_s)\tilde{A}_i + i\gamma_{ipsp}\tilde{A}_p^2\tilde{A}_s^*, \quad (S3)$$

wherein $\tilde{A}_m$ (m=p,s,i) are the intra-cavity light fields for pump, signal, and idler modes, sitting on the fast-oscillating background of $e^{-i\omega_m t}$, where $\omega_m$ is the angular frequency of the light. Frequency conservation requires $\omega_s+\omega_i=2\omega_p$, which is assumed in deducing the equations. Our convention is to define the higher and lower frequency OPO outputs as signal and idler, respectively. The cavity fields are normalized so that $|\tilde{A}_m|^2=U_m$ (m=p,s,i), which represents the intra-cavity energy. The first terms in Eqs. (S1-S3) describe the free cavity evolution (without sources or nonlinear effects), where $\Delta\omega_m$ (m=p,s,i) represents the detuning of laser/light frequency ($\omega_m$) from the natural cavity frequency ($\omega_{0m}$), i.e., $\Delta\omega_m=\omega_m-\omega_{0m}$. $\Gamma_{tm}$ describes the decay of the intra-cavity energy $U_m$, which includes the intrinsic cavity loss and the out-coupling to waveguide, $\Gamma_{tm}=\Gamma_{0m}+\Gamma_{cm}$. Here the decay term $\Gamma_{lm}$ is related to optical quality factor $Q_{lm}$ by $$\Gamma_{lm} = \frac{\omega_{0m}}{Q_{lm}}, \quad (l = t, 0, c; m = p, s, i). \quad (S4)$$

Figure 11:
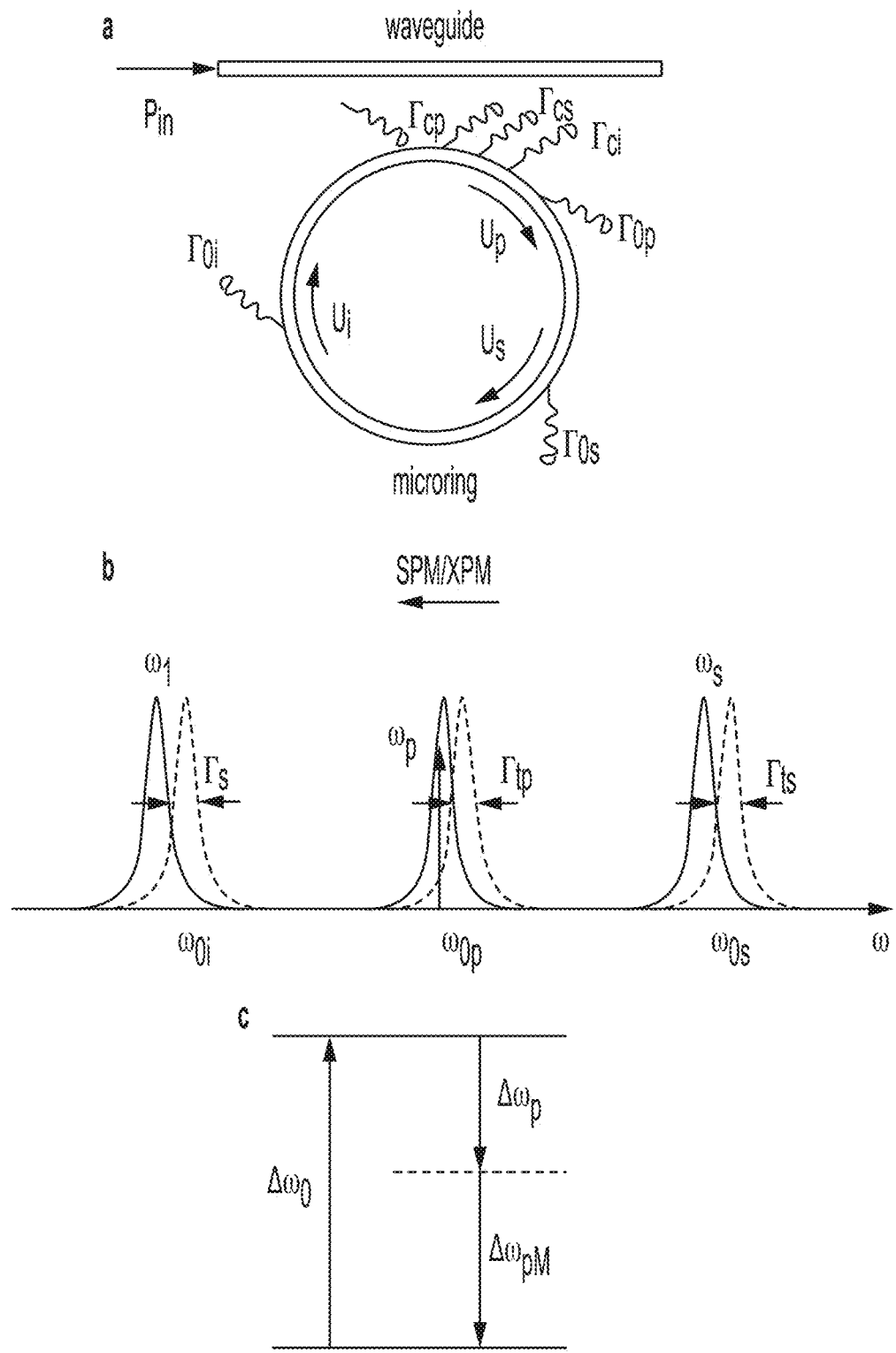
FIG. 11 shows a configuration for optical parametric oscillator. (a) Nanophotonic OPO scheme. The pump laser with a power of Pin is coupled at a rate Γcp into the microring resonator. The intra-cavity pump energy Up is resonantly enhanced by an amount proportional to the photon lifetime in the microring. When the pump energy reaches the threshold value, that is, the four-wave mixing generation rates are larger than the cavity losses for signal and idler modes, intra-cavity OPO (Us, Ui) can be built up coherently. Each mode has two decay paths in total and the total decay is represented by Γtm (m=p,s,i). One decay path is through intrinsic loss of the cavity Γ0m (sidewall scattering) and the other path is through coupling out to the waveguide Γcm. (b) Nonlinear resonance shifts of the cavity modes. The intense intra-cavity pump field yields self-phase modulation (SPM) of the pump mode and cross-phase modulation (XPM) of the signal and idler mode, and red-shifts the cavity resonances from their natural resonance frequencies ω0m (m=p,s,i). The cavity linewidths remain unchanged and the full-wave-half-maximum (FWHM) values are given by Γtm. (c) Frequency diagram of the OPO process. The OPO process requires pump detuning to compensate the overall frequency mismatch, including natural cavity frequency mismatch and the differences of the SPM and XPM shifts. Here the detunings follow the previous definition Δωm=ωm−ω0m (m=p,s,i). The natural frequency mismatch is given by Δω0=ω0s+ω0i−2ω0p, which is related to Δv in the main text by a factor of 2π.

We use $\Gamma$ instead of Q so that it is more straightforward to describe the physics of the cavity, as shown in FIG. 11(*a,b*). The second and third terms in Eqs. (S1-S3) describe self/cross-phase modulations (SPM/XPM) and four-wave mixing (FWM) of the cavity fields, respectively. For SPM, $\gamma_m$ is short for $\gamma_{mmmm}$ (m=p,s,i) and describes the phase modulation of the in mode on itself. For XPM, $\gamma_{mn}$ is short for $\gamma_{mnmn}$ (m,n=p,s,i, m≠n) and describes the phase modulation of the m mode by the n mode. The phase modulation, when inside the microring, manifests itself as a shift of cavity frequencies as shown in FIG. 11(b). The third-order nonlinear ($\chi^{(3)}$) effects, including SPM, XPM, and FWM, are described by the cavity nonlinear parameter given by the following equation generally:

$$\gamma_{mnuv} = \frac{3\omega_m \eta_{mnuv} \chi^{(3)}_{mnuv}}{4c_0 \tilde{n}^4_{mnuv} \overline{V}_{mnuv}}, \text{ (with } m, n, u, v = p, s, i),\quad (S5)$$

which is a positive real parameter. $\eta_{mnuv}$ characterizes the spatial overlap of interacting optical modes given by:

$$\eta_{mnuv} = \frac{\int_V dv \sqrt{e_m e_n e_u e_v}\, \tilde{E}_m^* \tilde{E}_n \tilde{E}_u^* \tilde{E}_v}{\left(\int_V dv\, e_m^2 |\tilde{E}_m|^4 \int_V dv\, e_n^2 |\tilde{E}_n|^4 \int_V dv\, e_u^2 |\tilde{E}_u|^4 |\tilde{E}_v|^4 \int_V dv\, e_v^2 |\tilde{E}_v|^4 \right)^{\frac{1}{2}}},\quad (S6)$$

where $\tilde{E}_m$ represents the dominant electric field components of the $m=p,s,i$ mode. This mode is related to $A_m$ in that $U_m = |A_m|^2 \approx \int v^{dv} e_m |\tilde{E}_m|^2$. Here the approximation is made possible when the other electric field components are much smaller than the dominant one, for example, $|\tilde{E}_z|, |\tilde{E}_\varphi| \ll |\tilde{E}_r|$ for transverse-electric-like (TE) modes. $\chi^{(3)}_{mnuv}$ is short for $\chi^{(3)}(-\omega_m; \omega_n, -\omega_u, \omega_v)$ and represents the third-order nonlinearity at $\omega_m$ with the inputs at $\omega_n, \bullet_u, \omega_v$. $\tilde{n}_{mnuv}$ represents average linear refractive index $\tilde{n}_{mnuv} = (n_m n_n n_u n_v)^{1/4}$. Likewise, $\overline{V}_{mnuv}$ represents average mode volume $\overline{V}_{mnuv} = (V_m V_n V_u V_v)^{1/4}$, where individual mode volume is given by:

$$V_m = \frac{\left(\int_V dv\, e_m |\tilde{E}_m|^2\right)^2}{\int_V dv\, e_m^2 |\tilde{E}_m|^4}.\quad (S7)$$

The last term in Eq. (S1) is the source term that represents the pump laser that is coupled into the cavity. The coupling rate $\Gamma_{cp}$ is given by Eq. S4 and the input field $\tilde{S}_{in}$ is normalized in such a way that $|\tilde{S}_{in}|^2 = P_{in}$ represents the input power in the waveguide (FIG. 11).

Terms representing phenomena such as nonlinear absorption and free carrier effects are not considered in Eqs. (S1-S3), as silicon nitride ($Si_3N_4$) is a wide bandgap material and does not have such effects in the frequency ranges of interest in this work. Moreover, quantum fluctuation of the signal and idler bands are not included because we are only interested in the classical regime, when the OPO is near and above parametric threshold.

We first study the near-threshold case of the OPO process for Eqs. (S1-S3). When the signal and idler intra-cavity energies are small ($U_s, U_i \ll U_p$), their nonlinear contribution can be neglected. The equations are then reduced to $$\frac{d\tilde{A}_p}{dt} = [i(\Delta\omega_p + \gamma_p U_p) - \Gamma_{tp}/2]\tilde{A}_p + i\sqrt{\Gamma_{ep}}\,\tilde{S}_{in},\quad (S8)$$

$$\frac{d\tilde{A}_s}{dt} = [i(\Delta\omega_s + 2\gamma_{sp} U_p) - \Gamma_{ts}/2]\tilde{A}_s + i\gamma_{spip}\tilde{A}_p^2 \tilde{A}_i^*,\quad (S9)$$

$$\frac{d\tilde{A}_i}{dt} = [i(\Delta\omega_i + 2\gamma_{ip} U_p) - \Gamma_{ti}/2]\tilde{A}_i + i\gamma_{ipsp}\tilde{A}_p^2 \tilde{A}_s^*,\quad (S10)$$

where SPM and XPM terms, now combined with the linear detuning terms, effectively create nonlinear detunings for all three intra-cavity light fields. If we assume that signal and idler fields are nonzero ($|\tilde{A}_s|, |\tilde{A}_i| \neq 0$), in steady-state these equations yield $$[(\Delta\omega_p + \gamma_p U_p)^2 + (\Gamma_{tp}/2)^2]U_p = \Gamma_{cp} P_{in},\quad (S11)$$

$$(\Delta\omega_s + 2\gamma_{sp} U_p)/\Gamma_{ts} = (\Delta\omega_i + 2\gamma_{ip} U_p)/\Gamma_{ti},\quad (S12)$$

$$(4\gamma_{sp}\gamma_{ip} - \gamma_{spip}\gamma^*_{ipsp})U_p^2 + 2(\gamma_{sp}\Delta\omega_i + \gamma_{ip}\Delta\omega_s)U_p + \Delta\omega_s \Delta\omega_i + (\Gamma_{is}/2)(\Gamma_{ti}/2) = 0,\quad (S13)$$

where aforementioned energy and power normalizations are used. Here Eq. (S11) describes the relation of pump threshold power in the waveguide and the intra-cavity threshold energy. Eq. (S12) indicates that the ratios of overall detunings to the cavity linewidths are identical. This equation is related to the coherence of the OPO. Eq. S13 is the equation leads to the intra-cavity threshold energy, which needs to have a positive solution for OPO to occur. At this point, it is important to recall the requirements for detunings:

$$\omega_s + \omega_i - 2\omega_p = \Delta\omega_s + \Delta\omega_i - 2\Delta\omega_p + \omega_{0s} + \omega_{0i} - 2\omega_{0p} = 0,\quad (S14)$$

We consider the case that frequency matching can be matched for signal and idler, that is, $\Delta\omega_s = -2\gamma_{sp} U_p$ and $\Delta\omega_i = -2\gamma_{ip} U_p$, which is clearly a solution for Eq. (S12). The frequency matching for pump, however, is not guaranteed to be matched automatically and needs to be adjusted by laser detuning. Such detuning needs to consider both the natural frequency mismatch and also the nonlinear cavity shilling due to phase modulation (FIG. 11(b)). For simplicity, we define $\Delta\omega_0 \equiv \omega_{0s} + \omega_{0i} - 2\omega_{0p}$, which is related to the frequency mismatch ($\Delta\nu$) in the main text by $\Delta\omega_0 = 2\pi\Delta\nu$, where when close to pump, positive values correspond to anomalous dispersion and negative values correspond to normal dispersion. We also define $\Gamma_t \equiv \sqrt{\Gamma_{ts}\Gamma_{ti}}$, $\gamma_{FWM} \equiv \sqrt{\gamma_{spip}\gamma^*_{ipsp}}$, $\gamma_{XPM} \equiv \gamma_{sp} + \gamma_{ip}$, and $\gamma_{PM} \equiv \gamma_{sp} + \gamma_{ip} - \gamma_p$. Eqs. (S13, S14) then reduces to $$U_p = \frac{\Gamma_t}{2}\frac{1}{\gamma_{FWM}},\quad (S15)$$

$$\Delta\omega_p = \frac{\Delta\omega_0}{2} - \frac{\Gamma_t}{2}\frac{\gamma_{XPM}}{\gamma_{FWM}},\quad (S16)$$

We bring these into Eq. (S11), and the pump threshold power is therefore given by:

$$P_{in} = \frac{1}{\Gamma_{cp}}\frac{\Gamma_t}{2}\frac{1}{\gamma_{FWM}}\left[\left(\frac{\Delta\omega_0}{2} - \frac{\Gamma_t}{2}\frac{\gamma_{PM}}{\gamma_{FWM}}\right)^2 + \left(\frac{\Gamma_{tp}}{2}\right)^2\right],\quad (S17)$$

We can see that the threshold power critically depends on frequency matching. For example, an OPO with an overall detuning of $3\Gamma_{tp}$ would require 10× higher threshold power than the ideal case, if all other parameters are the same. In the main text, we search for devices that have zero frequency mismatch ($\Delta\omega_0 = 0$) for the natural cavity frequencies for convenience. However, this dispersion condition is not optimized for the threshold power. In fact, it is $\Gamma_{ti}\Gamma_{ts}/\Gamma^2_{tp} + 1$ times of the ideal case, if we assume the nonlinear parameters are similar for phase matching ($\gamma_{sp}$, $\gamma_{ip}$, $\gamma_p$) and four wave mixing ($\gamma_{spip}$, $\gamma_{ipsp}$). We still use the natural frequency mismatch for two reasons. First, this factor ($\Gamma_{ti}\Gamma_{ts}/\Gamma^2_{tp}-1$) is typically within 2 and therefore does not make a very significant difference. Second, it is difficult in practice to estimate the phase modulation terms accurately a priori.

The overall detuning should be zero to minimize the threshold power. In other words, the natural frequency mismatch should be a positive value that matches the difference of the SPM and XPM ($\Delta\omega_0 = \Gamma^-_t \gamma_{PM}/\gamma_{FWM}$). In such case, the threshold power is reduced to $$P_{in} = \frac{1}{\Gamma_{cp}} \frac{\Gamma_t}{2} \left(\frac{\Gamma_{tp}}{2}\right)^2 \frac{1}{\gamma_{FWM}} = \frac{\omega_p^2 Q_{xp}}{Q_{ip}^2 \sqrt{Q_{ts}Q_{ti}}} \frac{e_0 n_{0p}^2 n_{0s} n_{0i} \hat{V}_{spip}}{6\eta_{spsi} \sqrt{\chi_{spip}\chi^*_{ipsp}}}. \quad \text{(S18)}$$

This equation can give some important hints for OPO competition besides frequency matching. First, only pump frequency, but not signal and idler frequencies, is present in this equation, which implies that widely-separated OPOs are no different than closeband OPOs and therefore can be as effective when optimized. Second, this equation suggests that we can suppress the close-band OPO by controlling the coupling Q. We notice that for the close-band OPOs, $Q_{ts}$, $Q_{ti} \approx Q_{tp}$ in general, because both intrinsic and coupling Q values are similar. Therefore, the Q dependence of the threshold power for the close-band OPO is $Q_{cp}/Q^3_{tp}$, compared to $Q_{cp}/(Q^2_{tp} \sqrt{QtsQti})$ for the widely-separated OPO. We define the suppression ratio to be the ratio of these two values, i.e., $\sqrt{\sqrt{QtsQti}}/Q_{tp}$. To suppress the close-band OPO relative to widely-separated OPO, we need to increase $Q_{ts}$, $Q_{ti}$ and decrease $Q_{tp}$. Moreover, Eq. S18 suggests that the threshold power is minimized when the pump is critically coupled ($Q_{cp}=Q_{0p}$), and signal and idler extremely under coupled ($Q_{cs}=Q_{ci}=\infty$). In this case, the threshold power is reduced to $$P_{in} = \frac{\omega_p^2}{Q_{0p}\sqrt{Q_{0s}Q_{0i}}} \frac{2e_0 n_{0p}^2 n_{0s} n_{0i} \hat{V}_{spip}}{3\eta_{spsi}\sqrt{\chi_{spip}\chi^*_{ipsp}}}. \quad \text{(S19)}$$

While it is difficult to achieve different coupling for pump, signal and idler modes in the close-band OPOs, it is possible to design such coupling for the widely-separated OPOs, as signal and idler frequencies are separated far way. Moreover, we notice that such configuration of Q factors not only yields the optimized threshold power for the widely-separated OPO, but also naturally suppresses the close-band OPO processes over widely-separated OPO processes. The suppression ratio is 2 $\sqrt{Q0sQ0i}/Q0p$, and is ≈2 assuming $Q_{0s}$, $Q_{0i} \approx Q_{0p}$. The suppression ratio can be further increased when the pump modes are overcoupled, at a price of increased threshold power. Although the coupling effects are generally difficult to isolate to confirm such a suppression ratio in practice, and we show some experimental data supporting this argument.

In Eq. (S19), the parameters to optimize (besides frequency matching and coupling Q engineering) appear in the right term. The refractive indices and mode volumes of the three modes together have a minor difference on the threshold power (<10%) for the widely-separated case and the close-band case (the frequency dependence of $\chi^{(3)}$ is not studied in this paper, and requires further examination). In particular, mode overlap ($\eta_{spip}$) guarantees that the widely-separated OPO process be in consideration when competing processes are also potentially realizable. In our case, because all the modes are single fundamental transverse-electric (TE1) modes, the mode overlap is 90% of the perfect case (i.e., close-band OPOs), even when signal and idler are separated ≈200 THz away.

In summary, analysis of the equations presented in this section shows that widely-separated OPOs can operate at similar threshold powers as close-band OPOs when optimized. We find that, besides dispersion design for frequency matching, coupling quality factor engineering (i.e., through the coupling design) can also be used to optimize the wide-band OPO process, by suppressing the dose-band OPOs (see Section V for details) and/or minimizing the threshold power of the wide-band process.

Figure 12:
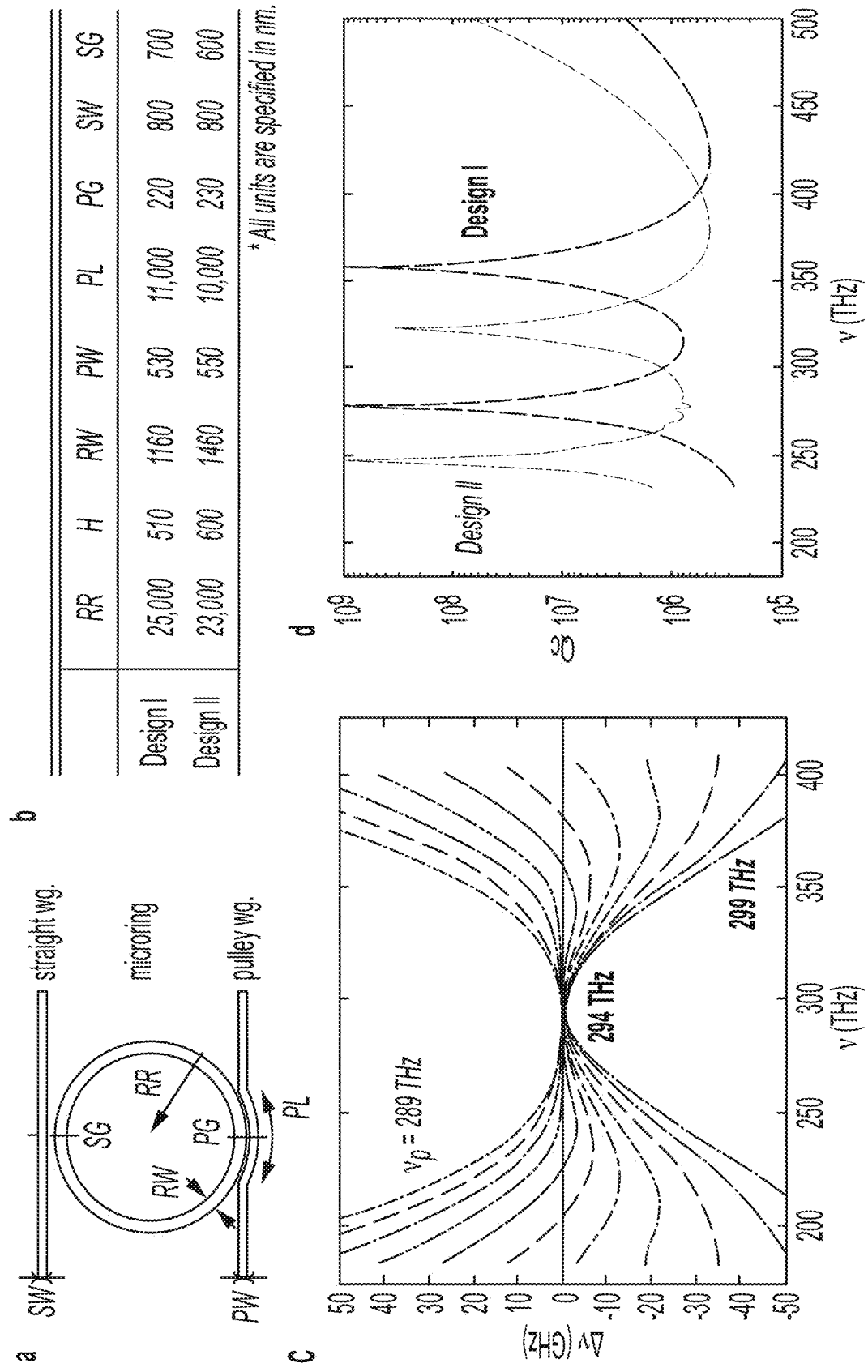
FIG. 12 shows (a) device blueprint for widely separated OPO, wherein two waveguides are used to couple pump, signal, and idler light. The top straight waveguide couples idler light. The bottom pulley waveguide couples pump and signal light. Three parameters control the dispersion of the microring: thickness (H), microring width (RW), and microring radius (R). Two more parameters are needed for defining the coupling to the straight waveguide (wg.): waveguide width (SW) and gap (SG). Additionally, three parameters are needed to describe pulley wg. coupling: pulley width (PW), pulley gap (PG), and pulley length (PL). (b) A parameter table for two typical geometries studied in the main text. (c) The simulated frequency mismatch (Δv) of design II with different pump frequencies. The data of the widely-separated OPO studied in the main text are highlighted in red. (d) The simulated frequency-dependent coupling Q (Qc) of the pulley waveguides in design I and II. We tailor the pulley coupling so that the pulley resonances (dips in coupling Q) fit the pump and visible frequencies for each design.

We used designs to demonstrate widely-separated OPOs and summarize the devices parameters in FIG. 12 for several designs. Design I generates OPO at 700 nm and 1300 nm by 920 nm pump. Design II generates OPO at 780 nm and 1500 nm by 1020 nm pump. The device parameters are labeled in FIG. 12(*a*) and their typical values are summarized in FIG. 12(*b*). There are three parameters for the device dispersion—thickness (H), ring radius (RR), and ring width (RW). The dispersion engineering has been already been discussed in detail for design I in the main text. Here we provide further data for design II in Fig. S2(c), where the pump is tuned from 289 THz to 299 THz. The device has a radius of 23 µm and the free spectral range (FSR) is close to 1 THz. When the pump is below 291 THz, we can see that the overall dispersion is anomalous, which is only suited for close-band OPO generation. When the pump frequency is between 292 THz to 294 THz, the dispersion around the pump is normal and the signal and idler are widely separated in frequency. While our simulation range is too small to conclude for the 295 THz case, for pump frequencies above 296 THz, the device seems to be too normal to support any frequency and phase matched modes. The overall trend is similar to design I, but there are only one pair of widely separated modes supported by this design.

In terms of the coupling, we use two waveguides to couple pump, signal, and idler modes, because it is very challenging to couple widely-separated signal and idler within one waveguide. For example, we provide coupling data for design I in FIG. 12(*d*). We use a straight waveguide to couple the idler mode that has the largest wavelength. Because of the evanescent coupling nature, pump and signal modes are more confined within microring and waveguide and therefore are not coupled efficiently by such a waveguide. We also use a pulley waveguide, which is a waveguide with a constant width (PW) wrapped around the microring with a constant gap (PG) for a certain coupling length (PL). Such a structure can efficiently couple pump and signal despite the limited evanescent overlap, because of the increased coupling length, while the waveguide width is chosen so that it is cut off slightly below the idler wavelength and therefore does not couple the idler mode. In FIG. 12(*d*), we show the calculated wavelength-dependent coupling behavior of our pulley designs. The coupling curves each have two dips (optimal coupling rates) at 325 THz (950 nm) and 450 THz (714 nm) for design I, and 285 THz (1050 nm) and 380 THz (790 nm) for design II, respectively.

Figure 13:
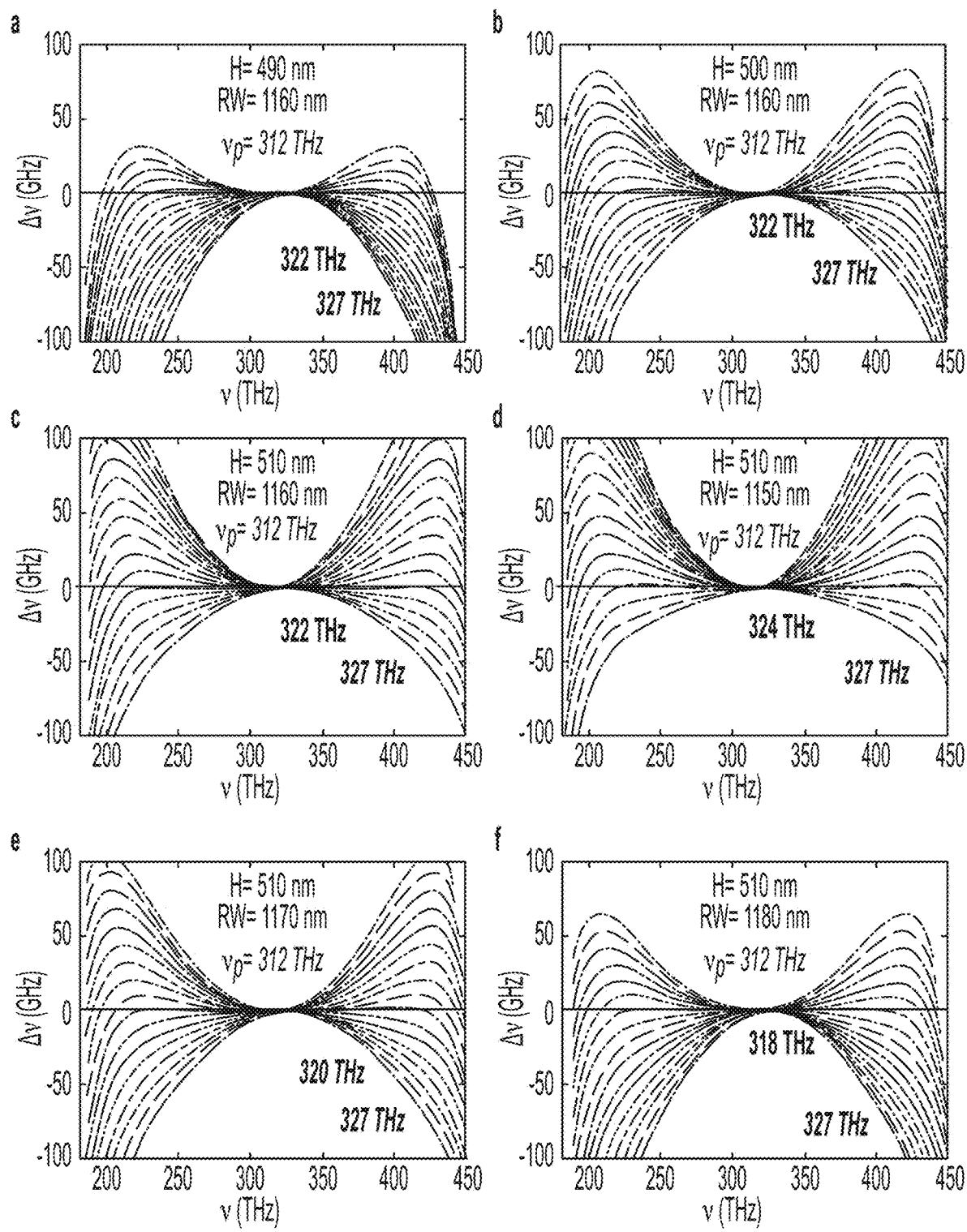
FIG. 13 shows dispersion sensitivity of the frequency match (Δv) on thickness (H) and ring width (RW). (panels a-c) Dispersion sensitivity on H. The widely-separated OPO is very sensitive to H. For example, for a fixed RW of 1160 nm, a design with H=510 nm shows widely-separated phase and frequency matched modes with normal dispersion at the pump (c), while designs with H=500 nm and H=490 nm show no widely-separated modes for OPO. vp changes from 312 THz to 327 THz (from top to bottom) with ≈0.9 THz FSR. The bold green lines indicate vp=322 THz, which is close to what is investigated in experiment. (panels d-f) Dispersion sensitivity on RW. The sensitivity of the dispersion to RW is significantly less when compared with H. For example, (d,c,e,f) show devices with RW of (1150 nm, 1160 nm, 1170 nm, 1180 nm), respectively. All devices show widely-separated frequency matched modes, with vp of 324 THz, 322 THz, 320 THz, and 318 THz, respectively. Here all parameters other than H and RW are given in the previous section (design I)

Two dispersion design principles for widely-separated OPOs include phase and frequency matching for the widely-separated mode set and normal dispersion at the pump mode. These two design principles, when separated, have both been achieved previously. Normal dispersion at one wavelength can be achieved by various parameters, because the change in H can usually be compensated by the change in RW. For widely-separated frequency matching only, the dispersion design also shows a similar trend although the design is less trivial. The OPO device is more sensitive in H than RW as the combination of these two principles is nontrivial. For the dispersion engineering based on H, we showcase its sensitivity in FIG. 13(a)-(c). Here all three devices with H of 490 nm, 500 nm, and 510 nm can satisfy widely-separated frequency matching similarly, but only the 510 nm device (FIG. 13(c)) can support the normal dispersion when the pump is at 322 THz (green). In contrast, the first two devices, as shown in FIG. 13(a,b), although have normal dispersion at pump frequencies around 322 THz (green), do not support frequency matched pairs for widely-separated OPO for these pump frequencies. Moreover, when these two devices have such widely-separated matched pairs, e.g., when pump is around 315 THz (purple), the dispersion near the pump is quite anomalous. Because of this anomalous dispersion, these widely-separated OPO, although in principle allowed, are usually took over by close-band OPO in practice. We note that this sensitive dependence on H is quite general in design, although we have only show one case here. On the other hand, when we vary the ring width parameter, e.g., (d) 1150 nm, (c) 1160 nm, (e) 1170 nm, and (f) 1180 nm in FIG. 13, both widely-separated modes and normal dispersion around the pump are simultaneously obtainable, although the optimized pump frequency shifts slightly as (d) 324 THz, (c) 322 THz, (e) 320 THz, and (f) 318 THz, respectively. We note that the device is sensitive to RR as well, because the bending dispersion also contributes to the overall dispersion design, particularly for the widely-separated case.

The device layout was done with the Nanolithography Toolbox, a free software package developed by the NIST Center for Nanoscale Science and Technology. The $Si_3N_4$ layer is deposited by low-pressure chemical vapor deposition on top of a 3-m thick thermal $SiO_2$ layer on a 100 mm diameter Si wafer. The wavelength-dependent refractive index and the thickness of the layers are measured using a spectroscopic ellipsometer, with the data fit to an extended Sellmeier model. The device pattern is created in positive-tone resist by electron-beam lithography. The pattern is then transferred to $Si_3N_4$ by reactive ion etching using a $CF_4$/$CHF_3$ chemistry. The device is chemically cleaned to remove deposited polymer and remnant resist, and then annealed at 1100° C. in an $N_2$ environment for 4 hours. An oxide lift-off process is performed so that the microrings have an air cladding on top while the input/output edge-coupler waveguides have $SiO_2$ on top to form more symmetric modes for coupling to optical fibers. The facets of the chip are then polished for lensed-fiber coupling. After polishing, the chip is annealed again at 1100° C. in an $N_2$ environment for 4 hours.

Figure 14:
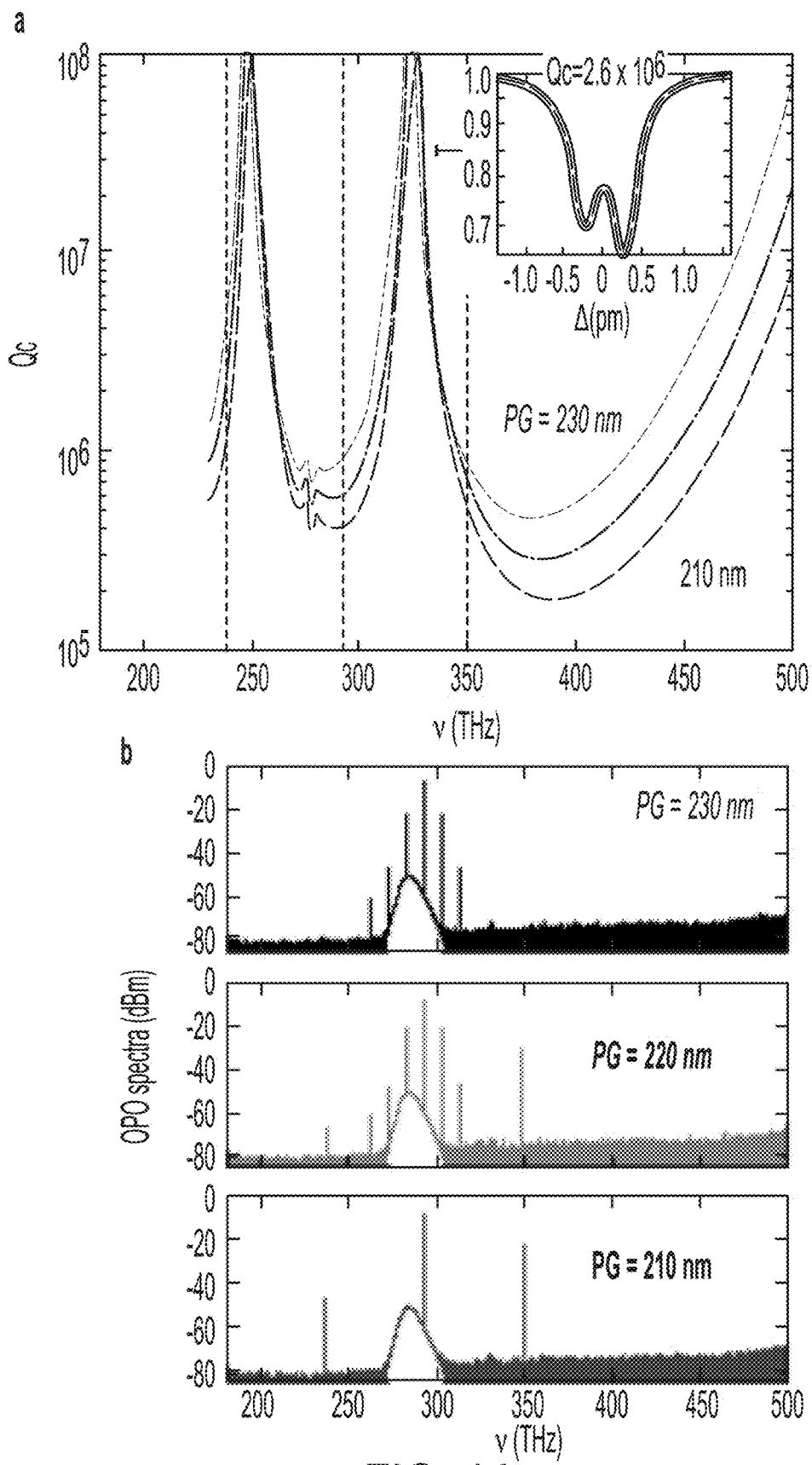
FIG. 14 shows effect of waveguide-microring coupling on competition between OPO processes. (a) Coupling Qs for pulley gaps of 230 nm, 220 nm, and 210 nm (from top to bottom). The device inset shows a typical optical mode at the pump band. The fitting indicates an intrinsic Q of (2.6±0.1)×$10^6$. Dashed lines indicate the targeted idler, pump, and signal frequencies, from left to right, respectively. (b) OPO generation for various pulley gaps. For a closer gap, the close-band OPOs are suppressed because the pump band is more over-coupled in relative to signal and idler band.

The relative coupling of the pump and signal/idler OPO modes can be used to suppress the close-band OPOs. In FIG. 12(d), we showed that the pulley coupling can be optimized to particular pump and signal frequencies. Here, we show that when changing the gap of such pulley coupling from 230 nm to 210 nm in 10 nm increments, the change in $Q_c$ is spectrally non-uniform, as shown in FIG. 14(a). We calculate the suppression ratio ($\sqrt{Q_{ts}Q_{ti}}/Q_{tp}$, in these cases, where $Q_{tm}$ (m=p,s,i) is given by $Q_{tm}=Q_{0m}+Q_{cm}$. $Q_{cm}$ is extracted from the simulation (FIG. S4(a)) and $Q_{0m}$ is assumed to be 2.5×10⁶ (inset of FIG. S4(a) shows a fitting of a typical pump transmission recorded experimentally). The suppression ratio is therefore estimated to be 1.31, 1.38 and 1.45 for the gap of 230 nm (blue), 220 nm (yellow), and 210 nm (red). These values suggest that we can have more suppression for the close-band OPO while decreasing the coupling gap, and the trend is clearly observable experimentally in FIG. 14(b). In the 230 nm device, only close-band OPOs are observed. In the 220 nm device, both close-band OPO and widely-separated OPO are observed, which indicates that these two OPO cases have similar power thresholds. In the 210 nm device, however, only the widely-separated OPO is observed. We want to emphasize that these devices have the same geometry except for the coupling gap, and are adjacent to each other on the chip so that unintended difference in geometry (e.g., film thickness) are expected to be negligible.

Figure 15:
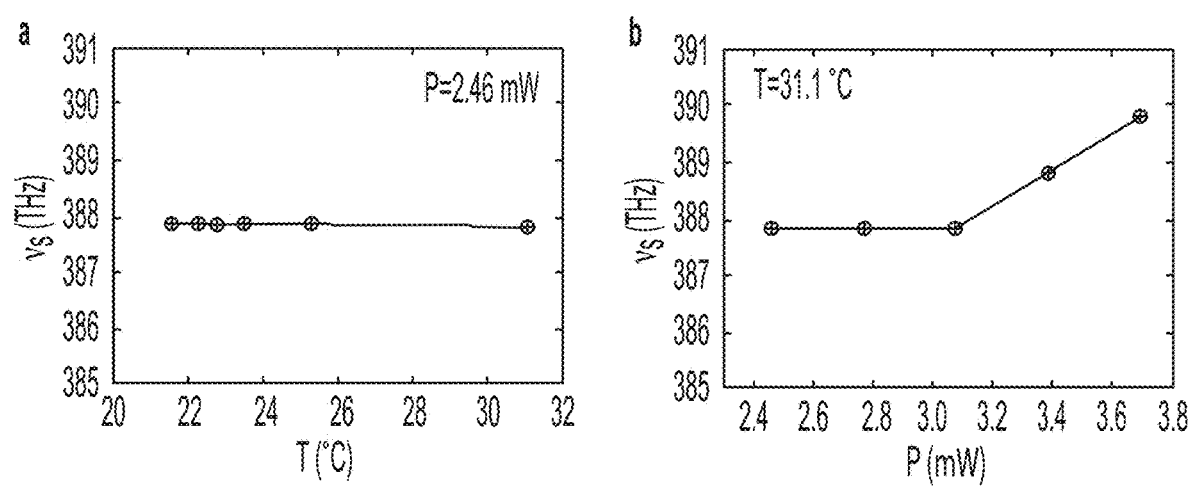
FIG. 15 shows thermal and power effects on widely-separated OPOs. (a) Thermal stability of the OPO. At the same pump power level, that is, P=2.46 mW, the device outputs are stable in frequency when temperature (T) changes from 21.5° C. to 31.1° C. (b) The OPO outputs are stable for pump power from 2.46 mW to 3.70 mW. When the pump power is further increased, the OPO signal blueshifts 1 FSR for ≈0.3 mW increase. The measurements are carried out at T=31.1° C.

We present experimental data for the thermal dependence and pump power dependence. FIG. 15(a) shows that the OPO frequency is stable over 10° C. temperature tuning. This temperature stability allows our device to operate reasonably stable in the environment, also we have not tested the device in extreme temperatures. For the power dependence, we notice that at higher power above the threshold, the device OPO blueshifts to higher frequency as the power increase. The effect can be explained by FIG. 11(c). When the power is so high that the phase change of the intra-cavity energy is larger than the natural cavity mismatch, we use red detuning of the pump, which is usually not directly accessible due to thermal bistability. Therefore, a close mode set with larger natural cavity mismatch becomes the optimized OPO. Here we show that the OPO can be tuned at a rate of 1 FSR (1 THz for 23 μm device) per 0.3 mW and that the number of FSRs can be adjusted by device radius, in principle.

Example 2

On-Chip Optical Parametric Oscillation into the Visible: Generating Red, Orange, Yellow, and Green from a Near-Infrared Pump The on-chip generation of coherent, single-frequency laser light that can be tuned across the visible spectrum would help enable a variety of applications in spectroscopy, metrology, and quantum science. Third-order optical parametric oscillation (OPO) in a microresonator has shown great promise as an efficient and scalable approach towards this end. However, considering visible light generation, so far only red light at <420 THz (near the edge of the visible band) has been reported. In this work, we overcome strong material dispersion at visible wavelengths and demonstrate on-chip OPO in a $Si_3N_4$ microresonator covering >130 THz of the visible spectrum, including red, orange, yellow, and green wavelengths. In particular, using an input pump laser that is scanned 5 THz in the near-infrared from 386 THz to 391 THz, the OPO output signal is tuned from the near-infrared at 395 THz to the visible at 528 THz, while the OPO output idler is tuned from the near-infrared at 378 THz to the infrared at 254 THz. The widest signal-idler separation of 274 THz is more than an octave in span and is the widest demonstrated for a nanophotonic OPO to date. This Example shows how nonlinear nanophotonics can transform light from readily accessible compact near-infrared lasers to targeted visible wavelengths of interest.

On-chip generation of coherent visible light is important for scalable manufacturing and field-level deployment of many applications in spectroscopy, metrology, and quantum optics. For example, many wavelength references and optical clocks are based on visible lasers stabilized to atomic systems. Moreover, many quantum systems suitable for local storage and manipulation of quantum information, including trapped ions, atoms, and spins in crystals, have optical transitions that require visible pump lasers for operation. A direct approach is to develop on-chip lasers based on III-V semiconductors, e.g., indium gallium nitride lasers, but spectral coverage is typically limited by the available gain media. Achieving spectral coverage via direct optical transitions over a wide range of wavelengths is challenging, and integrating such a laser into a mature photonic integrated circuit platform is also nontrivial.

Nonlinear optics is another route to visible light generation. While optical harmonic generation enables access to visible wavelengths via a near-infrared pump, the output frequency tuning range is limited to a small multiple of the input frequency tuning range. In contrast, optical parametric oscillation (OPO) provides a mechanism by which output light with wide spectral coverage can be obtained using only limited tuning of a single pump laser. Over the past few decades, table-top OPO has been extensively studied for visible light generation, and has been a major workhorse for laboratory purposes, Such table-top OPO provides a versatile source of high-power tunable laser light, but is also bulky, expensive, and lacks the miniaturization and scalability for field-level deployment in many applications.

On-chip OPO based on both the second-order ($\chi^{(2)}$) and third-order ($\chi^{(3)}$) nonlinearity has been intensely studied in microphotonic and nanophotonic resonators. While both processes can be successful, we note that the pump laser requirements are very different. For $\chi^{(2)}$ OPO, the energy conservation criterion requires $\upsilon_p = \upsilon_s + \upsilon_i$, where p, s, i represent pump, signal, idler respectively. As a result, generation of a visible wavelength signal will require a pump laser in the blue to ultra-violet region (depending on how short an output wavelength is desired). In contrast, for $\chi^{(3)}$ OPO, the energy conservation criterion is $2\upsilon_p = \upsilon_s + \upsilon_i$. Because two pump photons now contribute to the process, visible wavelength output is accessible from a near-infrared pump laser. Such lasers are commercially available in compact forms, including distributed feedback (DFB) and distributed Bragg reflector (DBR) geometries.

Figure 16:
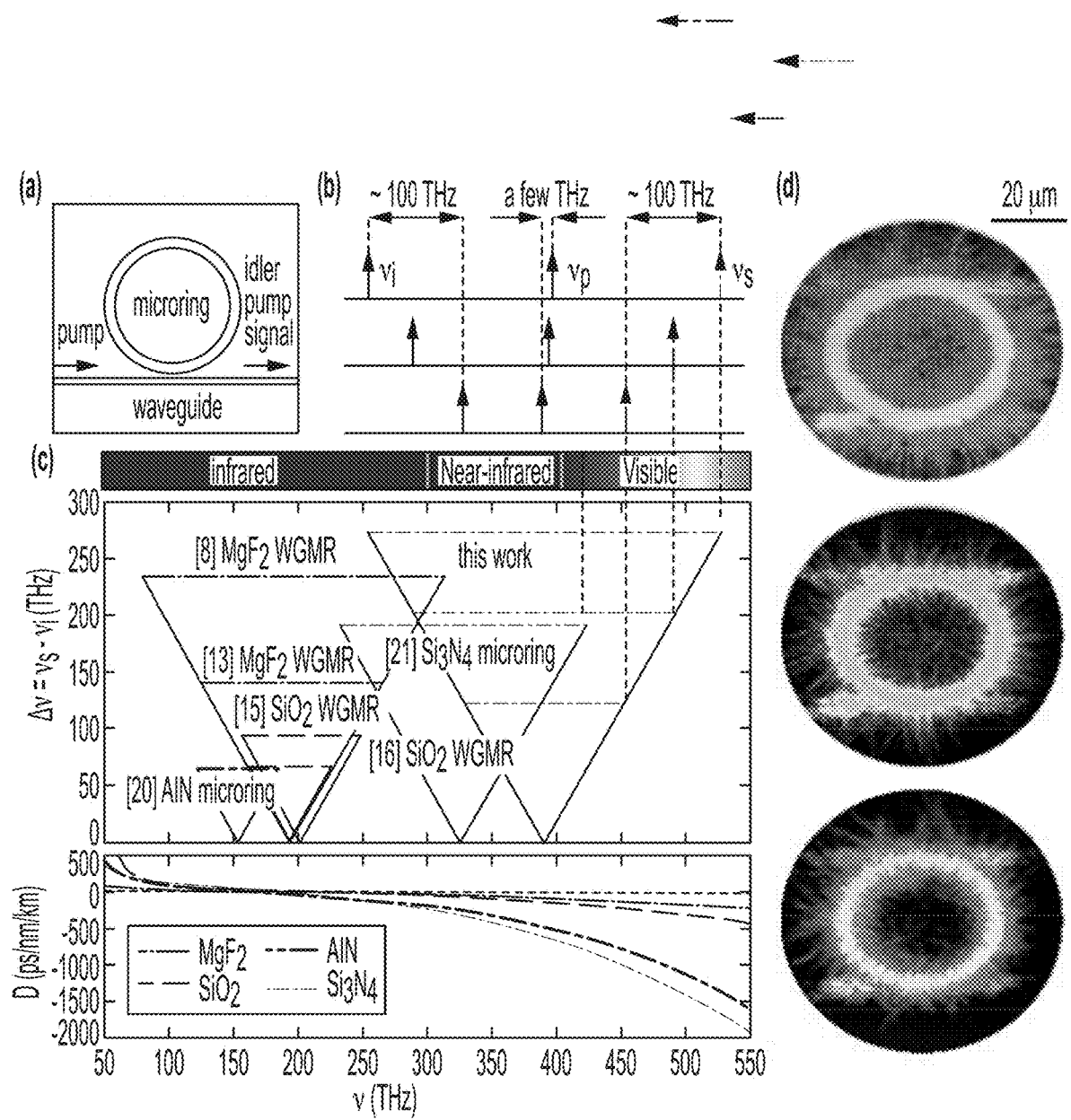
FIG. 16 shows optical parametric oscillation transforms a near-infrared pump into visible wavelength light. (a) Device and (b) scheme of the OPO process to generate signal and idler in the visible and infrared, respectively, using a pump in the near-infrared. When the pump shifts by only a few THz, the OPO outputs shift by ≈100 THz. This advantage makes OPO unique for light generation over broad spectral bands. (c) Top panel shows the comparison of widely-separated single signal-idler pair OPO in miniaturized/on-chip photonic devices. Most of these works are pumped by infrared lasers either at ≈193.5 THz (1.55 μm) for MgF2 and SiO2 whispering gallery mode resonators (WGMRs) or at ≈150 THz (2 μm) in an AlN microring, where the representative data with the widest span (y axis) are shown by the brown lines. An OPO work in $Si_3N_4$ uses a near-infrared pump at ≈330 THz (910 nm) to generate red light at the edge of the visible at ≈420 THz (714 nm), as shown by the dashed line, and the OPO herein can go deeper into the visible, where material dispersion is much larger (e.g., $Si_3N_4$ dispersion curve in the bottom panel), covering from red (bottom) to green (top), using only a few THz of pump tuning around ≈385 THz (780 nm). In particular, the top line shows the case where the OPO is octave-spanning, with idler and signal bridging infrared and green wavelengths. An experimental result and simulation (273.7 THz) results were consistent. (d) Top view microscope images of devices exhibiting OPO, showing the scattering of generated visible light in the red, orange, and green. These images are taken without ambient illumination, using a camera that is insensitive to the pump and generated idler wavelengths. The device is a $Si_3N_4$ microring with an outer radius of 25 μm. The 20 μm scale bar in the top right corner applies to all three images. Two waveguides are designed for each microring, as evident from the scattered light in the images, but only the bottom waveguide is used to effectively couple pump, signal, and idler light, as depicted in (a).

We describe widely-separated OPO based on the third-order nonlinearity in a silicon nitride ($Si_3N_4$) microring (FIG. 16(a)). Our OPO devices address ≈34% (130 THz) of the visible spectrum, including red, orange, yellow, and green colors, through a small change in the pump laser frequency (FIG. 16(b)). Our approach enables octave-spanning OPO to be observed, with a 527.8 THz (568.4 nm) signal in the green and a 254.1 THz (1181 nm) idler in the infrared. The corresponding span of 273.7 THz is the widest on-chip OPO reported so far—it is >40 THz larger than the previous record set for an infrared OPO—despite the substantial increase in material dispersion at visible wavelengths (FIG. 16(c)). We further show that through power tuning, the visible output signal can be tuned in a finer fashion, similar to devices with larger footprints. The device described here uses nonlinear nanophotonics to access desired wavelengths in the visible spectrum (FIG. 16(d)) and has numerous applications in spectroscopy, metrology, and quantum science.

A benefits of the $Si_3N_4$ OPO platform is pump laser integration. Such activities, which could include edge coupling of semiconductor gain media to the OPO chip, are being increasingly pursued in the context of microresonator frequency combs. More intimate and scalable integration of pump lasers and $Si_3N_4$ nonlinear nanophotonics is also possible, and we note the substantial recent efforts on heterogeneous integration of III-V gain media on $Si_3N_4$, including the demonstration of electrically-injected lasing at wavelengths below 1 μm.

The physical process to support widely-separated OPO is cavity-enhanced degenerate four-wave mixing. To achieve such a nonlinear optical process, both the momentum and energy for the interacting cavity modes have to be conserved. For the whispering gallery modes of a microring resonator, when modes from the same mode family (e.g., the fundamental transverse-electric mode TE1 in this work) are used, the momentum in question is in the azimuthal direction, and momentum conservation reduces to a simple equation, $m_s + m_i - 2m_p = 0$, where the subscripts s; i; p denote signal, idler, and pump, respectively, and m is the azimuthal mode number. Energy conservation requires frequency matching, and for the energy-conserving frequencies generated by the four-wave mixing process to match the corresponding cavity modes, we need $\hat{\upsilon}_s + \hat{\upsilon}_i - 2\hat{\upsilon}_p$ (where $\hat{\upsilon}_k$ represents the center resonance frequency of k-mode) needs to be approximately within the cavity linewidths ($\hat{\upsilon}_k = Q_k$, where $Q_k$ is the loaded quality factor for the k mode). While the above criteria are involved for efficient four-wave mixing between this set of cavity modes, they are not sufficient. In particular, as four-wave mixing can occur across multiple sets of modes simultaneously, another factor in device design is that all other signal and idler mode sets do not simultaneously realize frequency and phase matching. For example, close-to-pump OPO has been a competitive process for widely-separated OPO when the device exhibits anomalous dispersion around the pump. In brief, we require the device dispersion to be such that only a single set of widely-spaced signal, idler, and pump modes be phase- and frequency-matched.

Achieving such conditions can be especially challenging at visible wavelengths, due to the increased dispersion of the constituent materials. The bottom panel of FIG. 16(c) summarizes the first main challenge that our design space must address, which is the strong dispersion associated with $Si_3N_4$ in the visible, as quantified by its group velocity dispersion (GVD), which at 600 nm (500 THz) is many times the values at 1500 nm (200 THz). Other common microresonator OPO materials like $SiO_2$, AlN, and $MgF_2$ exhibit similar trends, though the problem is most acute for $Si_3N_4$. A second challenge is in how flexible the OPO design is in reaching wavelengths of interest. Ideally, we would prefer a design in which small changes in the pump frequency can results in large changes in the generated signal and idler frequencies, as schematically depicted in FIG. 16(b). Such a design would enable a broad range of output frequencies to be accessed from the narrow tuning ranges available from distributed feedback or distributed Bragg reflector pump lasers, for example. We note that the full desired spectral range does not necessarily need to be covered within one device (as multiple devices can be fabricated on the same chip in parallel), and as a result variations in the device's in-plane geometry (ring width and ring radius) can be considered, but the device layer thickness, which is more difficult to systematically control across a chip, should ideally remain the same.

Figure 17:
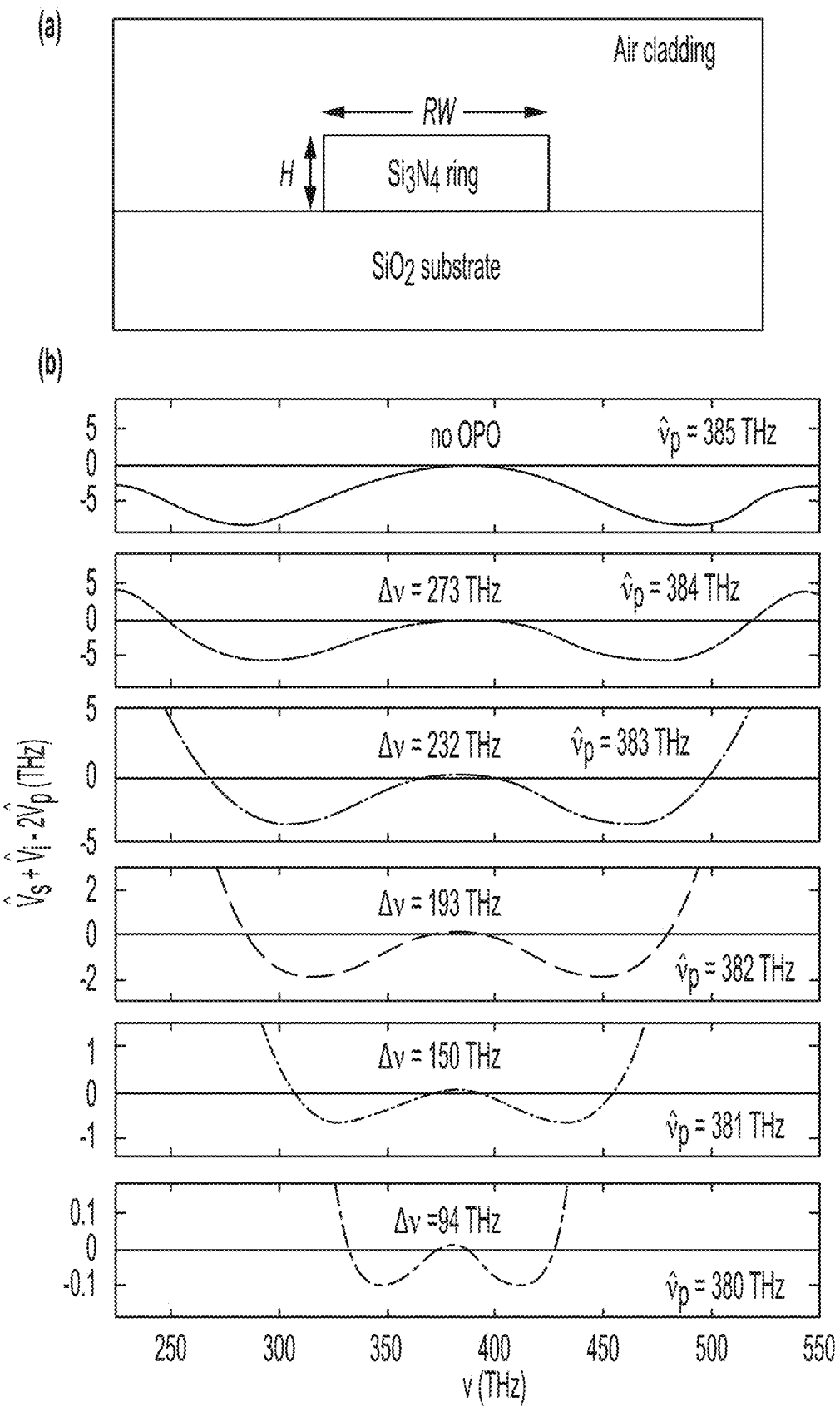
FIG. 17 shows a dispersion design for visible light generation. (a) Cross-section view of the device shows two geometric parameters, ring width (RW) and film thickness/height (H), that provide dispersion engineering. (b) Simulation shows the frequency matching profiles that support the OPO spectral separations. Frequency mismatch (y axis) is plotted for phase matched mode sets ($m_s+m_i-2m_p=0$), where the pump is shifted from 380 THz (bottom) to 385 THz (top) by a step of 1 THz. In the top panel, when the pump is at 385 THz (black), the device dispersion is too large to support any OPO. When the pump is decreased to 384 THz (green), the device supports octave-spanning OPO with idler and signal at 247.5 THz and 520.5 THz, respectively. A further decrease in the pump frequency leads to a smaller frequency span with different colors for the visible wavelength signal (e.g., yellow, orange, and red). The device has a radius of 25 μm, a thickness of 500 nm, and a radius of 825 nm.

We determine a $Si_3N_4$ microring geometry with three dispersion characteristics to satisfy the above criteria: (1) phase- and frequency-matching of a single set of widely-separated modes, with signal in the visible and idler in the infrared; (2) normal dispersion around the pump, to eliminate the possibility of close-to-pump OPO in which phase-matching is mediated by nonlinear frequency shifts; and (3) flexible tuning of the OPO output wavelengths. As the two parameters that define the cross-section of the microring (FIG. 17(a)), its ring width (RW) and thickness (H), have the strongest influence on the resonator dispersion, we focus our search on these parameters. In FIG. 17(b), we show the results of such a search. Here, we first consider the azimuthal mode numbers (m) and corresponding simulated frequencies (ˆvm) of TE1 modes using the finite-element method for a device with ring radius (RR) of 25 μm (corresponding free spectral range, or FSR, of 0.9 THz), H=500 nm, and RW=825 nm. For each configuration that satisfies phase matching, i.e., $m_s+m_i-2m_p=0$, the frequency mismatch is plotted. When the pump laser is at np=385 THz, while the pump is situated in normal dispersion, no modes are frequency and phase matched for OPO. When the pump laser is situated below 385 THz, the conditions for widely-separated OPO start to become fulfilled, with the pump remaining in normal dispersion while only a single pair of widely-separated modes is frequency matched. The span (separation between signal and idler mode frequencies) decreases as the pump frequency decreases, and the signal mode frequency moves from about 525 THz to 425 THz. For the widest OPO, the span is ≈273 THz, with the signal predicted to be in the green.

As noted above, with this design all of the aforementioned pump frequencies are in the normal dispersion regime, that is, $\hat{v}_s+\hat{v}_i-2\hat{v}_p<0$ when $\hat{v}_s$ and $\hat{v}_i$ are close to $\hat{v}_p$. Such dispersion prohibits close-to-pump OPO because any Kerr shift further decreases this frequency mismatch (more negative for OPO) when pump power is injected into the cavity. Therefore, we expect that our visible-infrared OPO devices should be free from competition due to close-to-pump GPO. Finally, we note that in FIG. 17, the resonator geometry is kept fixed and only the pump frequency is varied (in one FSR steps). Doing so results in relatively coarse jumps in OPO output signal and idler frequencies. However, we note that the device geometry itself can be varied—ultimately it is the dispersion of the resonator relative to the pump frequency that is important. As we shall show in the upcoming sections, varying both pump frequency and resonator geometry can lead to a finer coverage of the broad spectral range predicted in FIG. 17.

Figure 2:
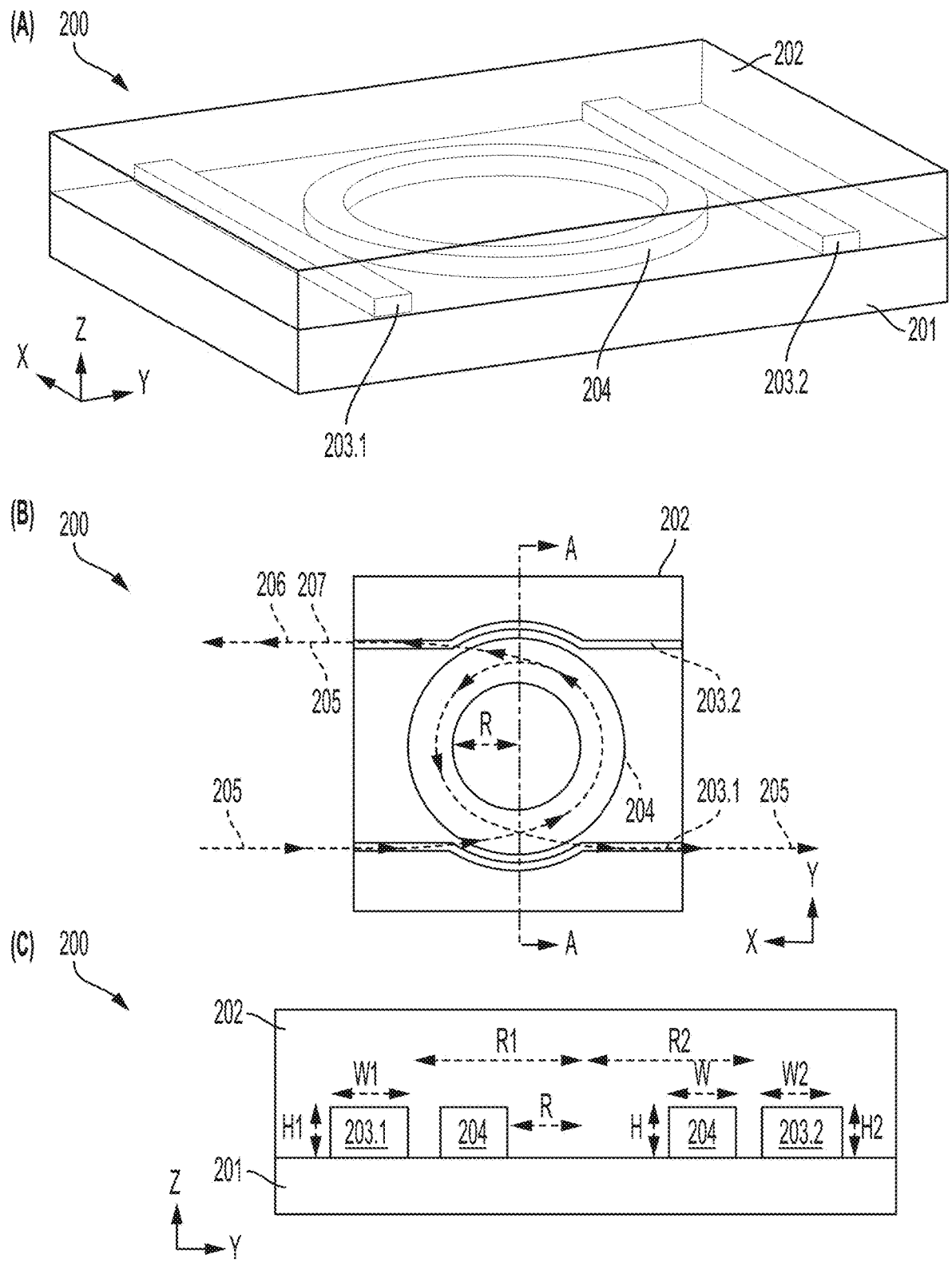
FIG. 2 shows an optical parametric oscillator in perspective view (panel A), top view (panel B), and cross-section (panel C) along line A-A shown in panel B.
Figure 18:
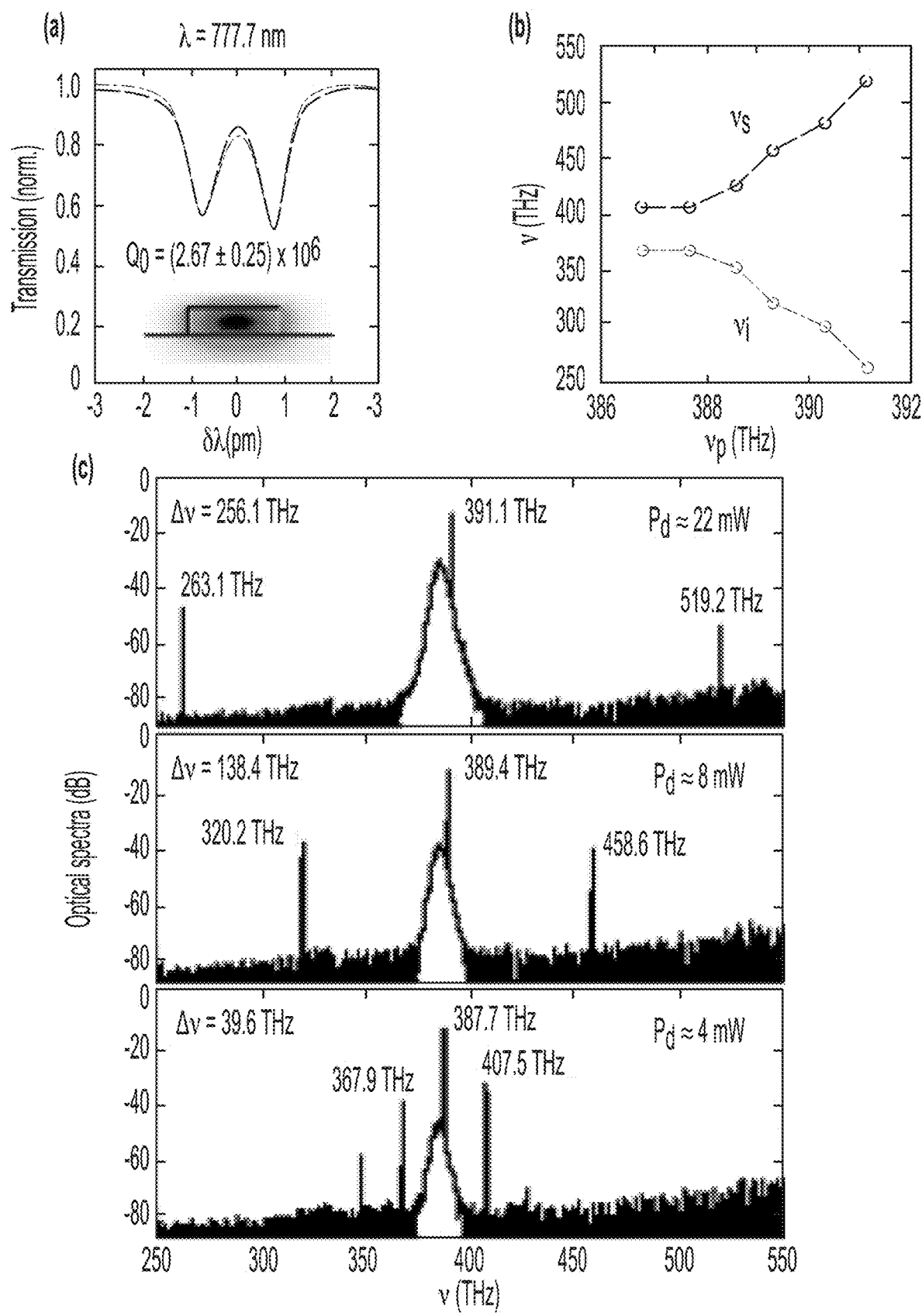
FIG. 18 shows widely-separated OPO in an exemplary device, (a) Normalized transmission of a pump mode (fundamental transverse-electric mode, whose electric field profile is in the inset) shows an intrinsic Q of $(1.67\pm0.15)\times10^6$, where the uncertainty is a one standard deviation value Obtained from the fitting of the doublet resonance. (b) When the pump frequency shifts by ≈5 THz, the signal and idler frequencies shift by 123 THz and 113 THz, respectively. The ratio of the signal/idler spectral tuning to that of pump is ≈26:1. (c) Three optical spectra are shown with pump frequency of 391.1 THz, 389.4 THz, and 387.7 THz, from top to bottom, respectively. Pump power dropped into the cavity can be larger when OPO span is larger. The spectra were clean without noise or competitive processes. In the bottom spectrum, a second pair of OPO sidebands emerges and is much weaker (≈20 dB) than the primary pair, and is commonly observed for OPO that is close to pump. The device has a radius of 25 μm, a thickness of 500 nm, and a nominal ring width of 826 nm. The resonator free spectral range is ≈0.9 THz.

The devices are fabricated (see Supplement 1 for details) according to the design shown in FIG. 2, with nominally fixed thickness and ring radius (H=500 nm, RR=25 μm) while varying the ring width (RW=820 nm to 830 nm). Dilute hydrofluoric acid (DHF) etching is incorporated as a key step to post-process the devices and achieve fine control of geometry at the sub-nanometer level, which in turn controls frequency- and phase-matching of the resonator modes. Moreover, in some cases DHF etching improves the modes' optical quality factors. After fabrication, devices are characterized as a function of np near the simulated near-infrared frequencies around 385 THz. For example, the characterization of widely-separated OPO in a device with nominal RW of 826 nm is shown in FIG. 18.

The pump mode has intrinsic Q in the range of $1\times10^6$-$2\times10^6$ and loaded Q≈$1\times10^6$. For example, we show in FIG. 18(a) a pump mode at 385.8 THz (777.7 nm), which is a fundamental transverse-electric mode (TE1) whose simulated field profile is shown in the inset (the resonance doublet is likely due to backscattering resulting from sidewall roughness, and seems to have a random amplitude in our devices). The output OPO spectra are recorded by an optical spectrum analyzer (OSA) as the pump is tuned over modes that support widely-separated OPO with normal dispersion around the pump, whose frequency is adjusted between 387 THz and 391 THz (FIG. 18(b)). When the pump frequency is >391 THz, no widely-separated OPO is observed. When the pump frequency is at 391 THz, the OPO device has its widest span of 256.1 THz (the top panel of FIG. 3(c)). The signal is at 519.2 THz (577.8 nm), which is yellow in color, and the idler is at 254.1 THz (1140 nm) in the infrared. A further decrease in the pump frequency shifts the signal to red at 458.6 THz (654.1 nm) and then towards the near-infrared at 407.5 THz (736.2 nm), with the corresponding idler shifting from within the infrared at 320.2 THz (936.9 nm) to the near-infrared at 367.9 THz (815.4 nm), as shown in the bottom two panels of FIG. 18(c).

With this device, a mere ≈5 THz pump shift leads to a 123 THz shift of the signal and a 113 THz shift of the idler. Such large amplification in the output tuning range relative to the pump tuning range comes from the large dispersion of the nanophotonic resonator in the targeted frequency matching bands, and is particularly useful when wide spectral coverage is needed. In the next section, we will describe how finer steps in this spectral coverage can be achieved.

The required pump power ($P_d$), specified in FIG. 18(c), has a dependence on the OPO span. $P_d=P(1-T)$ represents the pump power that is coupled into the microring, where P is the input pump power in the waveguide and T is the normalized cavity transmission of the pump laser mode. For example, in the top panel, an OPO spanning 256.1 THz requires a pump power of P≈42 mW in the waveguide, of which $P_d$≈22 mW is dropped into microring to excite the OPO above threshold. In the middle and bottom panel, where the OPO span is 54% and 15% of the widest span, the required dropped power is 36% and 18% of that in the top panel. Such power dependence may come from lower Q of the cavity resonances at higher frequencies.

The wavelengths at which light is generated are very sensitive to the device geometry because of the large amplification of the frequency span relative to the pump detuning from its nominal position. As shown in the previous section, even a change in pump mode of one free spectral range (FSR≈0.9 THz) leads to a >20 THz change in the frequency of the visible signal. Similarly, a small change in device dimension, even on the order of 1 nm, can lead to a different color of light generated in the visible band. In this section, we will focus on how we can use this dispersion sensitivity alongside the previously used pump tuning to more finely cover the very larger range of OPO output frequencies possible in this platform. While each of our devices is fabricated with its own bus waveguide, we note that multiple individually addressable devices can be fabricated with the same bus waveguide, as has been shown for second harmonic generation, for example.

Figure 19:
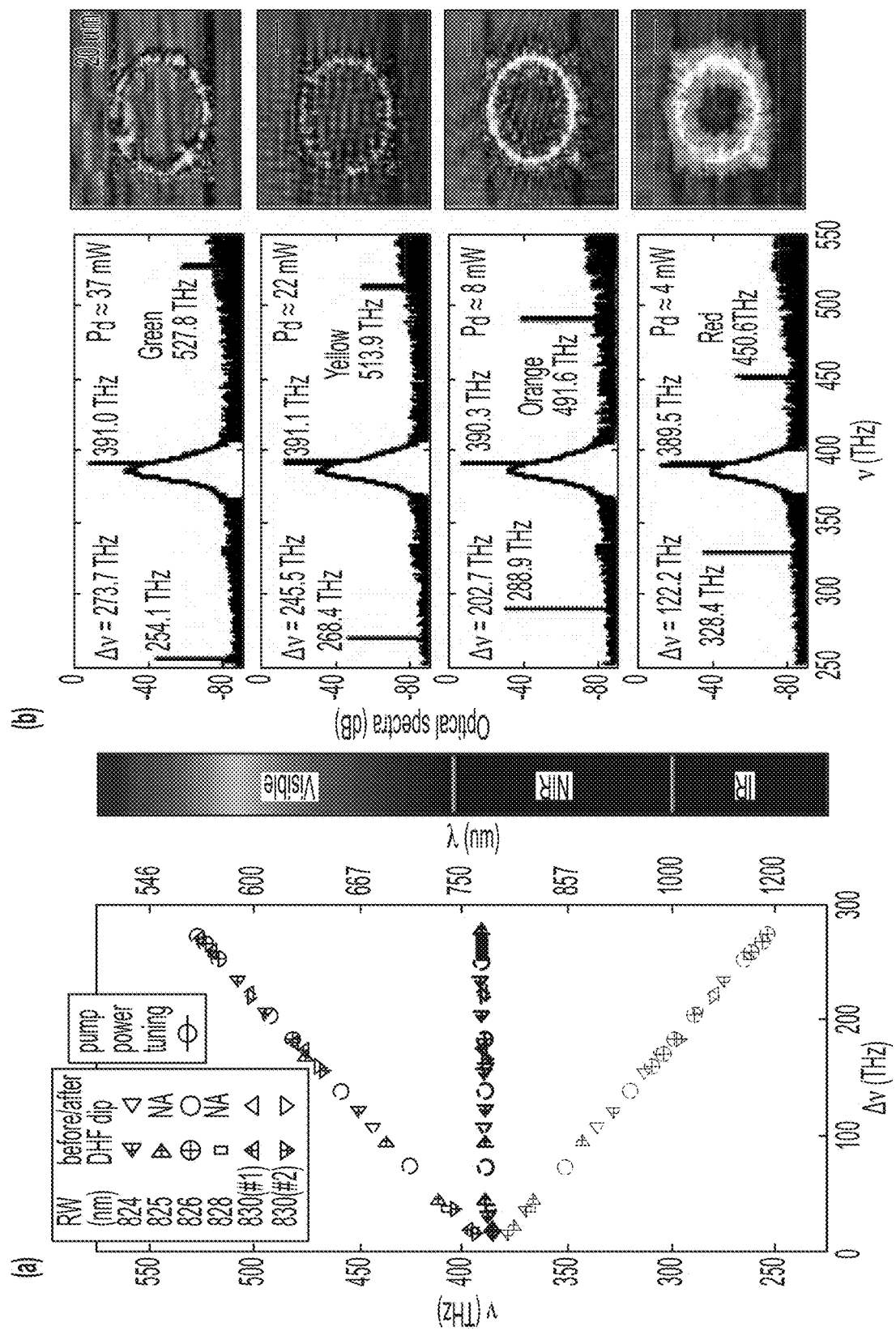
FIG. 19 shows OPO output light from red to green. (a) A collection of signal (red), pump (violet), and idler (blue) frequencies plotted versus the OPO span (Δv) for a series of devices in which the geometry (and hence dispersion) is slightly varied. The pump laser is scanned from 386 THz to 391 THz, and its span in use is only 5 THz. The OPO signal frequencies span>130 THz, corresponding to a 26 times amplification. Data is shown from six devices with ring widths from 824 nm to 830 nm before and after a dilute hydrofluoric acid (DHF) dip. The DHF dip isotropically removes <1 nm of $Si_3N_4$, which enables the corresponding tuning of the OPO output wavelengths with a resolution beyond what we achieve through lithography and dry etching alone. The overall frequency span covers red, orange, yellow, and green signal wavelengths. In particular, OPO frequencies with Δv from 256.1 THz to 273.7 THz are accessed by pump power tuning in a device with nominal RW of 826 nm after DHF dip. (b) Representative OPO spectra for signal output light in the green at 527.8 THz (568.4 nm), yellow at 513.9 THz (583.7 nm), orange at 491.6 THz (610.3 nm), and red at 450.6 THz (665.8 nm) from top to bottom, respectively. The trace corresponds to the widest OPO achieved by pump power tuning in (a). The coupling of signal (visible) light is 10 dB-20 dB smaller than the coupling of idler (near infrared or infrared) light because of the evanescent-coupling nature of the waveguide. Optical microscope images (with illumination) show the corresponding colors that are generated. The scale bars represent 20 μm in these four images.

In FIG. 19(a), we collect the pump, signal, and idler frequencies from different pumping modes in six devices with ring widths from 824 nm to 830 nm. We can see that within a 5 THz pump scan in the near-infrared (violet symbols), the OPO outputs of these devices taken together cover >270 THz, spanning from the infrared and near-infrared to the visible, and exceeds (by nearly 20 THz) the widest span shown in the previous section. The tuning of the signal and idler frequencies, although still discrete, is much finer in step than that of the single device shown in FIG. 18(b). In particular, this set of devices covers >130 THz of the visible band, including red, orange, yellow, and green colors (see the right color bar in FIG. 19(a)), and the average step in frequency tuning for the signal is a few THz, in comparison to the >20 THZ step shown in the previous section.

We next present four optical spectra showing the generation of green, yellow, orange, and red light in FIG. 19(b). In each case, the OPO spectrum shows no noise or competitive nonlinear processes, and its color is confirmed by optical microscope images when the device is in operation, showing red, orange, yellow, and green light generated in the microring. In particular, in a device with RW=826 nm, when the pump mode is at 391.0 THz (the top panel), we observe the widest OPO with a span of 273.7 THz, which is very close to the simulated value (273 THz). The pump mode frequency is ≈7 THz larger than the simulation (384 THz), which is likely due to a combination of uncertainty in the refractive index model chosen for $Si_3N_4$ and in the fidelity of the fabricated device dimensions relative to design. This octave-spanning OPO has a 527.8 THz (568.4 nm) signal and a 254.1 THz (1181 nm) idler.

We note that the threshold power increases from a few milliwatts to a few tens of milliwatts as the OPO output signal and idler becomes more widely separated (FIGS. 18(c) and 19(b)). This is likely due to a decrease in optical quality factors of the signal and/or idler modes. A rough estimate assuming Q values around $10^5$ and $10^6$ yields threshold powers of 28 mW and 2.8 mW, respectively.

The ability to realize continuous spectral coverage would complement the above demonstration of broad spectral coverage using the widely-separated OPO process. The broad coverage is made possible by the dispersion properties of the resonator, which results in an amplification of the signal tuning range relative to the pump laser tuning range of ≈26:1 (FIG. 19(a)). Of course, the resonant nature of the device is such that the pump laser is not tuned continuously, but instead in jumps across different pump modes separated by the resonator FSR≈0.9 THz. As a result, the output spectral coverage, though broad in overall extent, is sampled with both signal and idler frequencies varying in jumps of multiple FSRs, as shown in FIG. 19(a) when both pump frequency tuning and varying geometric dispersion are employed. In comparison, larger devices used in other OPO works in the infrared[8,13,15,16] obtain a finer step in output frequency. In this section, we show that we can achieve 1-FSR tuning steps for the signal and idler in the visible and infrared bands, respectively, by shifting one pump mode continuously through pump power tuning.

Figure 20:
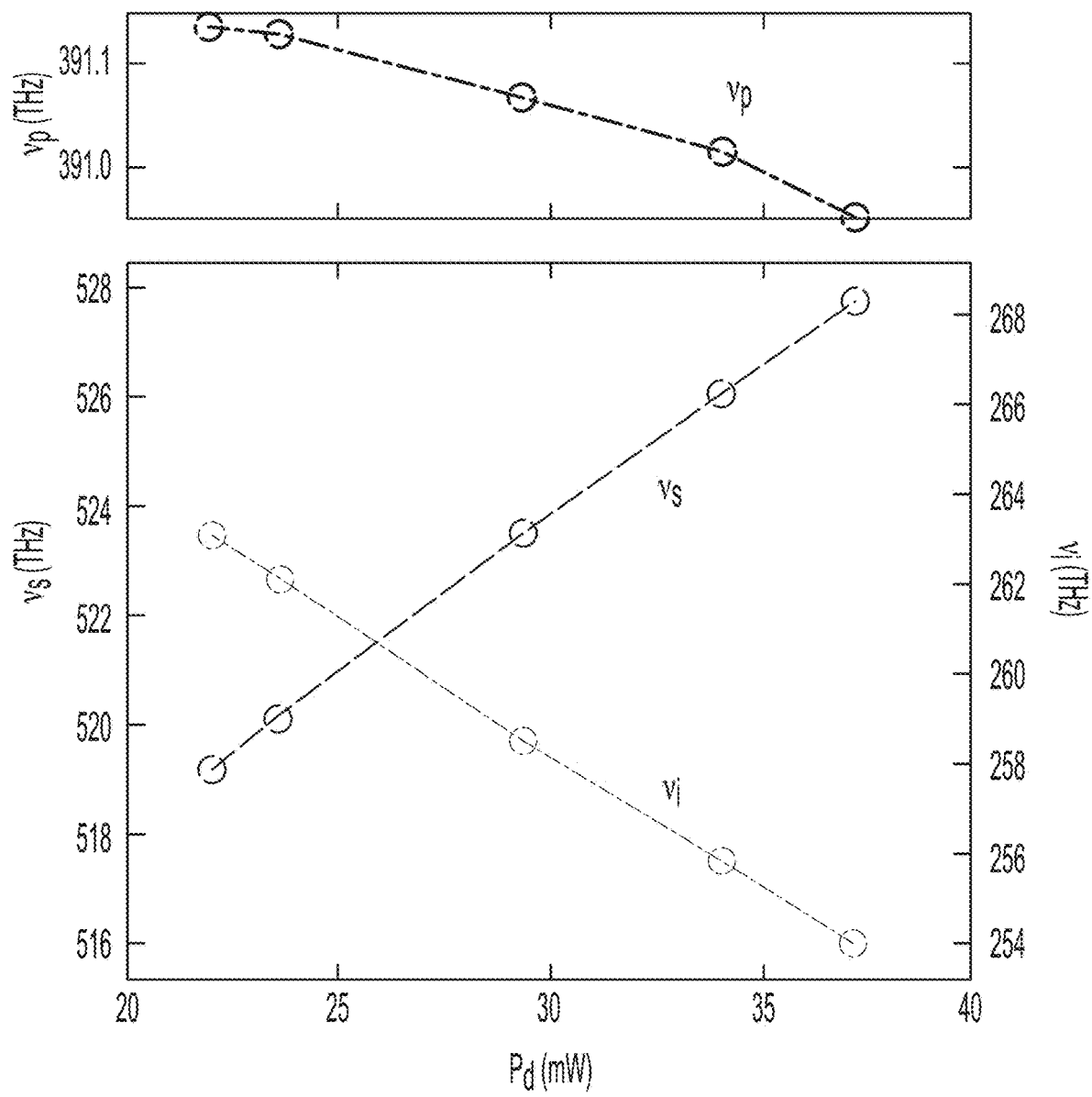
FIG. 20 shows tuning of OPO frequencies with pump power. When the dropped pump power (Pd=P(1−T), where P is the laser power in the waveguide and T is the normalized cavity transmission of the pump mode that can be adjusted by laser-cavity detuning) increases from 22 mW to 37 mW, the pump frequency (vp) is adjusted to follow the thereto-optical shift of the pump mode.
Figure 21:
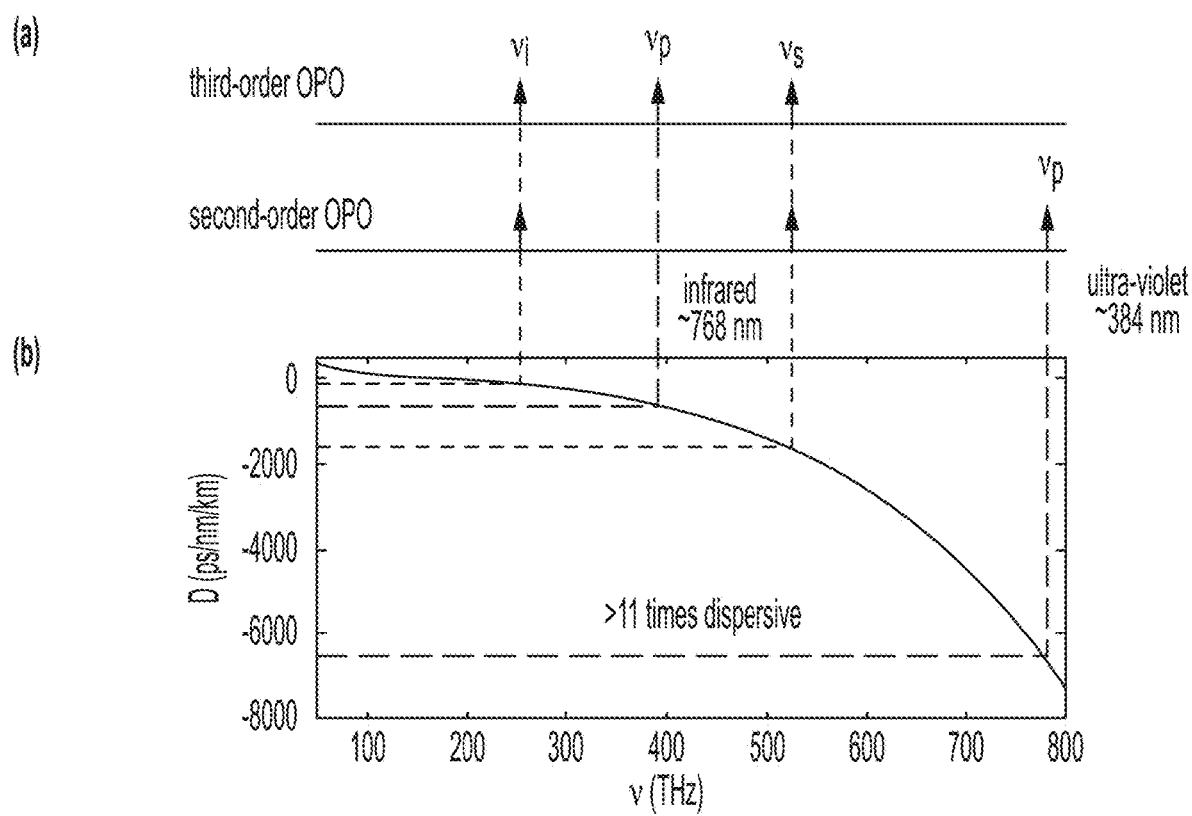
FIG. 21 shows $\chi^{(2)}$ versus $\chi^{(3)}$ OPO for visible light generation. (a) The comparison of two schemes of OPO to achieve the result we have shown in this work. Third-order OPO requires an infrared pump at 768 nm, while second-order OPO would require an ultra-violet pump at 384 nm. (b) The material dispersion is much larger at shorter wavelengths. For example, silicon nitride's dispersion is 11 times larger at 384 nm than at 768 nm.

An example of this coverage is shown in FIG. 20. This device generates green light as shown in the top panels of FIG. 18(c) and FIG. 19(b). The OPO frequencies depend on the pump power dropped into the microring ($P_d$), which results in a thereto-optical shift that linearly depends on $P_d$. We plot the pump (violet), signal (red), and idler (blue) frequencies versus $P_d$ in FIG. 20. When $P_d$ is 22 mW, the idler is at 263.1 THz and signal is at 519.2 THz (the top panel of FIG. 18(c)). When $P_d$ increases to 37 mW, the idler frequency decreases to 254.1 THz and signal frequency increases to 527.8 THz (the top panel of FIG. 19(b)). The visible frequency shifts by 8.6 THz, while the pump frequency shifts by <0.2 THz. Therefore, such thermo-optic tuning method can be used to improve the spectral coverage in the visible band, bringing the multiple-FSR jumps down to about 1 FSR. Going forward, further improvement in the output tuning resolution may require using larger devices with smaller FSRs, though this will come at the cost of increased threshold power and also an increased chance of competing or additional four-wave mixing processes (for example clusters of phase- and frequency-matched modes). The dispersion profile also needs to be adjusted and validated for larger devices.

We have demonstrated functional for applications, that is, using widely-separated OPO in $Si_3N_4$ as a flexible platform for realizing on-chip visible laser light sources and have shown the generation of light up to 527.8 THz, covering red, orange, yellow, and part of green. However, there are several applications for which accessing to higher frequencies, including the blue and violet, would be desirable.

The output visible power in some devices can include 30 dB to 40 dB below the pump power. A challenge is associated with efficient resonator-waveguide coupling, where we can see from FIG. 19(b) that idler light (with longer wavelength and hence improved spatial overlap between the waveguide and resonator modes) is coupled 10 dB to 15 dB better than the signal light. The coupling of visible light can be optimized by appropriately designed pulley couplers. Such couplers have to be designed for specific wavelength bands, and universal coupling across broad spectra, particularly for short wavelengths, is challenging due to the corresponding small dimensions required. Besides this coupling issue, at higher conversion efficiency levels, a clearer physical understanding of the pump depletion level to accurately predict both the intracavity and external signal/idler powers is needed. Finally, a frequency matching design is centered around a regime in which Kerr frequency shifts due to self- and cross-phase modulation are limited. Depending on the application, one may instead seek to operate in a higher pump power regime (to enable higher absolute output powers), in which case these Kerr shifts can be included in the design.

We use a fiber-coupled external cavity tunable diode laser at 780 nm to pump the devices. As noted earlier, there are several paths to more compact and integrated pumping solutions, including the use of commercial DFB and DBR laser solutions, hybrid integration of compact gain/laser chips to create full OPO modules, and heterogeneous integration of gain with $Si_3N_4$ photonics.

The level of wavelength tuning needed depends on the application. We have shown access to a broad range of output wavelengths between 568 nm and 1180 nm by varying the pump wavelength and device geometry, suggesting the ability to access a number of different spectral bands in a common photonics platform. Tuning from one output wavelength to another is discrete, however, and the finest tuning we have demonstrated is at the 1 FSR level. To move beyond this and improve the continuity of tuning, we note that thermal tuning has been implemented in both crystalline resonators and on-chip microrings. Such thermal tuning, taken together with the incorporation of many different resonator geometries (and corresponding dispersion profiles) on a common bus waveguide, may provide a first step to realizing both ultra-wide wavelength coverage and fine wavelength tuning.

Nanophotonic OPO devices have output frequencies (including both the signal and idler) that cover a range from 527.8 THz to 254.1 THz, which encompasses the green, yellow, orange, and red parts of the visible spectrum, as well as the near-infrared and a portion of the infrared spectrum. The OPO magnifies the frequency tuning span of the near-infrared pump source by ≈25 times in the generated output frequency ranges for both the infrared idler and visible signal light. Devices whose dispersion supports the widest separation in signal and idler frequencies exhibit octave-spanning OPO at <30 mW threshold power. We further show a tuning method to achieve 1-FSR output tuning steps. The OPO provides coherent on-chip sources of visible light.

The threshold of a $\chi^{(3)}$ OPO in microring can be estimated by[1], assuming perfect frequency and phase matching, $$P_{th} = \frac{\omega_p Q_{cp}}{Q_{tp}^2 \sqrt{Q_{ts} Q_{ti}}} \frac{\varepsilon_0 \bar{n}_{ipsp}^4 \bar{V}_{ipsp}}{6\eta_{ipsp} \chi_{ipsp}^{(3)}}. \quad (1)$$

where $\omega_p$ is the pump angular frequency. $Q_{cp}$ and $Q_{tp}$ are the coupling and loaded quality factors for the pump mode. $Q_{ts}$ and $Q_{ti}$ are the loaded quality factors for signal and idler modes. $\varepsilon_0$ is the vacuum permittivity constant. $\bar{n}_{ipsp}$, $\bar{V}_{ipsp}$, and $\eta_{ipsp}$ are average index, mode volume, and mode overlap for the degenerate four-wave mixing interaction. $\chi^{(3)}_{ipsp}$ is calculated from the $n_2$ value[2] following $\chi^{(3)} = 4/3n^2\varepsilon_0 c/n_2$, where n is the refractive index and c is the speed of light.

Consider two likely extremes ($Q_{ts}=Q_{ti}=1\times10^5$ and $Q_{ts}=Q_{ti}=1\times10^6$). The mode volume and mode overlap are extracted from simulations for pump, signal, and idler around 390 THz, 265 THz, and 515 THz. These values depend on wavelengths, but are at similar levels for different OPO signal-idler combinations. With these assumptions in mind, we estimate the expected thresholds. This range of estimated thresholds is consistent with those measured in the experiments.

The device layout in this Example was made with the Nanolithography Toolbox, a software package developed by the NIST Center for Nanoscale Science and Technology. The $Si_3N_4$ layer is deposited by low-pressure chemical vapor deposition on top of a 3 μm thick thermal $SiO_2$ layer on a 100 mm diameter Si wafer. The wavelength-dependent refractive index and the thickness of the layers are measured using a spectroscopic ellipsometer, with the data fit to an extended Sellmeier model. The device pattern is created in positive-tone resist by electron-beam lithography. The pattern is then transferred to $Si_3N_4$ by reactive ion etching using a $CF_4$/$CHF_3$ chemistry. The device is chemically cleaned to remove deposited polymer and remnant resist, and then annealed at 1100° C. in an $N_2$ environment for 4 hours. An oxide lift-off process is performed so that the microrings have an air cladding on top, while the input/output edge-coupler waveguides have $SiO_2$ on top to form more symmetric modes for coupling to optical fibers. The facets of the chip are then polished for lensed-fiber coupling. After polishing, the chip is annealed again at 1100° C. in an $N_2$ environment for 4 hours.

Dilute hydrofluoric acid (DHF) etching is used as a post-processing technique that isotropically removes $Si_3N_4$ with sub-nanometer control, providing a level of geometric control beyond what we achieve through electron-beam lithography and dry etching. Using a dilution of 100:1 ($H_2O$:HF), a $Si_3N_4$ etch rate of 0.4 nm/min is achieved (the correspond $SiO_2$ etch rate is 8 nm/min). We also note that DHF etching can also improve resonator quality factor; for example, >2× improvement in Q values are often observed.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associate ink objects of a list or alternatives and is not disjunctive; rather the elements can be used separately or can be combined together under appropriate circumstances.

What is claimed is:

1. An optical parametric oscillator for producing idler coherent light and signal coherent light from pump coherent light by balanced parametric dispersion, the optical parametric oscillator comprising:
    a substrate cladding;
    a microring resonator disposed on the substrate cladding and comprising:
        a Kerr nonlinear medium comprising an annulus with a radius R, a height H, and a width W that provides a balanced parametric dispersion;
        and that:
            receives pump coherent light from a waveguide; and
            produces idler coherent light and signal coherent light from the pump coherent light,
            the idler coherent light and signal coherent light produced according to the balanced parametric dispersion of the microring resonator;
        and
    a waveguide disposed on the substrate cladding in optical communication with the microring resonator and comprising a transparent Kerr nonlinear medium and that:
        receives pump coherent light; and
        communicates the pump coherent light to the microring resonator for production of the idler coherent light and the signal coherent light from the pump coherent light.

2. The optical parametric oscillator of claim 1, further comprising:
    a cover cladding disposed on the waveguide, the microring resonator, and the substrate cladding such that microring resonator and the waveguide are interposed between the substrate cladding and the cover cladding to encapsulate the microring resonator and the waveguide.

3. The optical parametric oscillator of claim 1, further comprising:

a second waveguide in optical communication with the microring resonator and comprising a transparent material and that:
receives the idler coherent light and the signal coherent light from the microring resonator.

4. The optical parametric oscillator of claim 1, wherein the substrate cladding comprises silicon dioxide.

5. The optical parametric oscillator of claim 1, wherein the radius R of the microring resonator is from 100 nm to 1 cm.

6. The optical parametric oscillator of claim 1, wherein the height H of the microring resonator is from 10 nm to 5 μm.

7. The optical parametric oscillator of claim 1, wherein the width W of the microring resonator is from 10 nm to 10 μm.

8. The optical parametric oscillator of claim 1, wherein a frequency of the pump coherent light is from 100 THz to 800 THz.

9. The optical parametric oscillator of claim 1, wherein a frequency of the idler coherent light is from 50 THz to 400 THz.

10. The optical parametric oscillator of claim 1, wherein a frequency of the signal coherent light is from 100 THz to 1000 THz.

11. The optical parametric oscillator of claim 1, wherein the balanced parametric dispersion is in accord with the threshold relationship given below:

$$P_{in} = \frac{1}{\Gamma_{cp}} \frac{\Gamma_t}{2} \frac{1}{\gamma_{FWM}} \left[ \left( \frac{\Delta\omega_0}{2} - \frac{\Gamma_t}{2} \frac{\gamma_{PM}}{\gamma_{FWM}} \right)^2 + \left( \frac{\Gamma_{tp}}{2} \right)^2 \right].$$

12. The optical parametric oscillator of claim 1, wherein the balanced parametric dispersion comprises:
a pump frequency node at a pump frequency $v_p$ and comprising a parametric dispersion that is zero;
an idler frequency node at an idler frequency $v_i$ and comprising a parametric dispersion that is zero;
an idler normal dispersion minimum interposed at a frequency between the pump frequency $v_p$ and the idler frequency $v_i$ and comprising a normal parametric dispersion;
an idler anomalous dispersion frequency at a frequency that is less than the idler frequency $v_i$ and comprising an anomalous parametric dispersion;
a signal frequency node at a signal frequency $v_s$ and comprising a parametric dispersion that is zero;
a signal normal dispersion minimum interposed at a frequency between the pump frequency $v_p$ and the signal frequency $v_s$ and comprising a normal parametric dispersion; and
a signal anomalous dispersion frequency at a frequency that is greater than the signal frequency $v_s$ and comprising an anomalous parametric dispersion;
wherein:
the balanced parametric dispersion consists essentially of the normal parametric dispersion between the idler frequency node and the pump frequency node; and
the balanced parametric dispersion consists essentially of the normal parametric dispersion between the pump frequency node and the signal frequency node.

13. The optical parametric oscillator of claim 1, wherein a central wavelength of the idler coherent light and a central wavelength of the pump coherent light are separated by 50 THz to 300 THz.

14. The optical parametric oscillator of claim 1, wherein a central wavelength of the signal coherent light and a central wavelength of the pump coherent light are separated by 50 THz to 300 THz.

15. A process for producing idler coherent light and signal coherent light from pump coherent light with the optical parametric oscillator of claim 1, the process comprising:
receiving the pump coherent light by the waveguide;
communicating the pump coherent light from the waveguide to the microring resonator; and
producing the idler coherent light and the signal coherent light from the pump coherent light according to the balanced parametric dispersion of the microring resonator.

16. The process of claim 15, further comprising:
receiving, by a second waveguide in optical communication with the microring resonator and comprising a broadly transparent medium, the idler coherent light and the signal coherent light from the microring resonator.

17. The process of claim 15, wherein the balanced parametric dispersion is in accord with $$P_{in} = \frac{1}{\Gamma_{cp}} \frac{\Gamma_t}{2} \frac{1}{\gamma_{FWM}} \left[ \left( \frac{\Delta\omega_0}{2} - \frac{\Gamma_t}{2} \frac{\gamma_{PM}}{\gamma_{FWM}} \right)^2 + \left( \frac{\Gamma_{tp}}{2} \right)^2 \right].$$

18. The process of claim 15, wherein the balanced parametric dispersion comprises:
a pump frequency node at a pump frequency $v_p$ and comprising a parametric dispersion that is zero;
an idler frequency node at an idler frequency $v_i$ and comprising a parametric dispersion that is zero;
an idler normal dispersion minimum interposed at a frequency between the pump frequency $v_p$ and the idler frequency $v_i$ and comprising a normal parametric dispersion;
an idler anomalous dispersion frequency at a frequency that is less than the idler frequency $v_i$ and comprising an anomalous parametric dispersion;
a signal frequency node at a signal frequency $v_s$ and comprising a parametric dispersion that is zero;
a signal normal dispersion minimum interposed at a frequency between the pump frequency $v_p$ and the signal frequency $v_s$ and comprising a normal parametric dispersion; and
a signal anomalous dispersion frequency at a frequency that is greater than the signal frequency $v_s$ and comprising an anomalous parametric dispersion;
wherein:
the balanced parametric dispersion consists essentially of the normal parametric dispersion between the idler frequency node and the pump frequency node; and
the balanced parametric dispersion consists essentially of the normal parametric dispersion between the pump frequency node and the signal frequency node.

19. The process of claim 15, wherein a central wavelength of the idler coherent light and a central wavelength of the pump coherent light are separated by 50 THz to 300 THz.

20. The process of claim 15, wherein a central wavelength of the signal coherent light and a central wavelength of the pump coherent light are separated by 50 THz to 300 THz.

* * * * *